(12) United States Patent
Kamatani

(10) Patent No.: US 9,515,587 B2
(45) Date of Patent: Dec. 6, 2016

(54) PHASE DETECTOR, MOTOR DRIVE CONTROLLER, MOTOR DEVICE, AND METHOD OF DETECTING PHASE OF ROTOR

(71) Applicant: Tomohiko Kamatani, Osaka (JP)

(72) Inventor: Tomohiko Kamatani, Osaka (JP)

(73) Assignee: RICOH COMPANY, LTD., Tokyo (JP)

( * ) Notice: Subject to any disclaimer, the term of this patent is extended or adjusted under 35 U.S.C. 154(b) by 29 days.

(21) Appl. No.: 14/633,794

(22) Filed: Feb. 27, 2015

(65) Prior Publication Data
US 2015/0253159 A1   Sep. 10, 2015

(30) Foreign Application Priority Data

Mar. 6, 2014  (JP) .................................. 2014-044230

(51) Int. Cl.
| | |
|---|---|
| H02P 6/06 | (2006.01) |
| H02P 6/16 | (2016.01) |
| G01D 5/14 | (2006.01) |
| H02P 6/18 | (2016.01) |

(52) U.S. Cl.
CPC ................. *H02P 6/16* (2013.01); *G01D 5/145* (2013.01); *H02P 6/188* (2013.01)

(58) Field of Classification Search
CPC ............ H02P 6/16; H02P 6/08; G01D 5/2448; G01D 5/145; G01D 5/20
USPC ................. 318/400.06, 700, 400.01, 400.04, 400.26,318/400.38, 715, 721
See application file for complete search history.

(56) References Cited

U.S. PATENT DOCUMENTS

| | | | | |
|---|---|---|---|---|
| 5,300,866 | A  * | 4/1994 | Yasohara | .................. H02P 6/06 318/400.07 |
| 5,493,187 | A  * | 2/1996 | Iijima | ....................... H02P 6/20 318/400.14 |
| 6,359,406 | B1 * | 3/2002 | Chiu | ..................... F02B 37/007 318/400.38 |
| 6,954,042 | B2 * | 10/2005 | Lee | .......................... H02P 6/16 318/400.38 |

(Continued)

FOREIGN PATENT DOCUMENTS

| | | |
|---|---|---|
| JP | 9-056192 | 2/1997 |
| JP | 2008-178227 | 7/2008 |

(Continued)

*Primary Examiner* — Bentsu Ro
*Assistant Examiner* — Thai Dinh
(74) *Attorney, Agent, or Firm* — Cooper & Dunham LLP

(57) ABSTRACT

A phase detector includes a crossing-point phase detection circuit to compare signals levels of pairs of sensor signals and output crossing-point phase detection signals indicating phases of crossing points between the pairs of the sensor signals, each having a signal level corresponding to a rotational position of a rotor of a motor having coils, a crossing-point level detection circuit to output crossing-point level signals indicating crossing-point levels detected, a signal selection circuit to select one of the sensor signals as a selection signal, a phase detection circuit to detect that a signal level of the selection signal has reached a threshold level, and output a phase data signal indicating a phase of the rotor corresponding to the threshold level, and an in-phase level adjustment circuit to adjust and output in-phase levels of the sensor signals to approach each of the crossing-point levels to a predetermined signal level.

13 Claims, 17 Drawing Sheets

(56) References Cited

U.S. PATENT DOCUMENTS

| | | | |
|---|---|---|---|
| 8,866,421 B2* | 10/2014 | Kamatani | H02P 6/16 |
| | | | 318/400.01 |
| 8,872,453 B2* | 10/2014 | Kamatani | H02P 6/16 |
| | | | 318/400.01 |
| 2005/0001570 A1* | 1/2005 | Lee | H02P 6/28 |
| | | | 318/400.38 |
| 2010/0219781 A1* | 9/2010 | Kuwamura | H02P 6/085 |
| | | | 318/400.04 |
| 2013/0099708 A1 | 4/2013 | Shimizu et al. | |
| 2013/0106326 A1 | 5/2013 | Kamatani et al. | |
| 2013/0106327 A1 | 5/2013 | Kamatani et al. | |

FOREIGN PATENT DOCUMENTS

| | | |
|---|---|---|
| JP | 2010-063300 | 3/2010 |
| JP | 2013-099022 | 5/2013 |
| JP | 2013-099023 | 5/2013 |

* cited by examiner

FIG. 2

| CROSSING-POINT DETECTION SIGNAL | HIGH LEVEL (Hi) | LOW LEVEL (Low) |
|---|---|---|
| UV | U1 ≥ V1 | U1 < V1 |
| VW | V1 ≥ W1 | V1 < W1 |
| WU | W1 ≥ U1 | W1 < U1 |

FIG. 3

| PERIOD | INPUT CONDITIONS OF SIGNAL | SELECTION SIGNAL | SIGNAL PHASE (°) |
|---|---|---|---|
| T1 | UV = Hi, VW = WU = Low | W1 | 150 – 210 |
| T2 | UV = VW = Hi, WU = Low | V1 | –30 – 30 |
| T3 | UV = WU = Low, VW = Hi | U1 | 150 – 210 |
| T4 | UV = Low, VW = WU = Hi | W1 | –30 – 30 |
| T5 | UV = VW = Low, WU = Hi | V1 | 150 – 210 |
| T6 | UV = WU = Hi, VW = Low | U1 | –30 – 30 |

| ELECTRIC ANGLE | AMPLITUDE RATIO |
|---|---|
| −30.0 | −0.500 |
| −22.5 | −0.383 |
| −15.0 | −0.259 |
| −7.5 | −0.131 |
| 0 | 0 |
| 7.5 | 0.131 |
| 15.0 | 0.259 |
| 22.5 | 0.383 |
| 30.0 | 0.500 |

AMPLITUDE ADJUSTMENT

PHASE DETECTOR, MOTOR DRIVE CONTROLLER, MOTOR DEVICE, AND METHOD OF DETECTING PHASE OF ROTOR

CROSS-REFERENCE TO RELATED APPLICATIONS

This patent application is based on and claims priority pursuant to 35 U.S.C. §119(a) to Japanese Patent Application No. 2014-044230, filed on Mar. 6, 2014, in the Japan Patent Office, the entire disclosure of which is hereby incorporated by reference herein.

BACKGROUND

Technical Field

Embodiments of the present disclosure relate to a phase detector to detect a phase of a rotor, such as a brushless direct current (DC) motor, a motor drive controller including the phase detector, a motor device including the motor drive controller, and a method of detecting a phase of a rotor.

Description of the Related Art

To control driving of a motor, such as a brushless DC motor, for example, the rotation angle of a rotor of the motor is detected with a sensor to control the rotational position of the motor. For a rotary encoder system, typically, a rotary encoder is connected to a rotation shaft, outputs two-phase pulse signals, which have phase differences of one-fourth cycle changing with the rotation angle, and detects a relative rotation angle from edge detection and high/low states of the two-phase signals.

For detection of multiple phases, for example, a motor drive controller generates a phase data signal based on multiple sensor signals, each having a signal level corresponding to a rotational position of a rotor of the motor, to control driving of the motor.

SUMMARY

In at least one aspect of this disclosure, there is provided an improved phase detector including a crossing-point phase detection circuit, a crossing-point level detection circuit, a signal selection circuit, a phase detection circuit, and an in-phase level adjustment circuit. The crossing-point phase detection circuit compares signal levels of respective pairs of multiple sensor signals and outputs crossing-point phase detection signals indicating phases of crossing points between the respective pairs of the sensor signals. Each of the sensor signals has a signal level corresponding to a rotational position of a rotor of a motor having multiple coils. The crossing-point level detection circuit detects crossing-point levels indicating signal levels of the crossing points between the respective pairs of the sensor signals and outputs multiple crossing-point level signals indicating the crossing-point levels detected. The signal selection circuit selects one of the sensor signals as a selection signal. The phase detection circuit detects that a signal level of the selection signal has reached a threshold level, and outputs a phase data signal indicating a phase of the rotor corresponding to the threshold level which the signal level has reached. The in-phase level adjustment circuit adjusts and outputs in-phase levels of the sensor signals to approach each of the crossing-point levels to a predetermined signal level.

In at least one aspect of this disclosure, there is provided an improved motor drive controller including the phase detector, a motor control circuit, and a motor driving circuit. The phase detector outputs the phase data signal. The motor control circuit is electrically connected to the phase detector to generate a control signal based on the phase data signal. The motor driving circuit is electrically connected to the motor control circuit to switch currents among the coils of the motor in accordance with the control signal to control driving of the motor.

In at least one aspect of this disclosure, there is provided an improved motor device including the motor and the motor drive controller electrically connected to the motor to control driving of the motor.

In at least one aspect of this disclosure, there is provided an improved method of detecting a phase of a rotor. The method including comparing signal levels of respective pairs of multiple sensor signals; outputting crossing-point phase detection signals indicating phases of crossing points between the respective pairs of the sensor signals, each of the sensor signals having a signal level corresponding to a rotational position of a rotor of a motor having multiple coils; detecting crossing-point levels indicating signal levels of the crossing points between the respective pairs of the sensor signals; outputting multiple crossing-point level signals indicating the crossing-point levels detected; selecting one of the sensor signals as a selection signal; detecting that a signal level of the selection signal has reached a threshold level; outputting a phase data signal indicating a phase of the rotor corresponding to the threshold level which the signal level has reached; adjusting in-phase levels of the sensor signals to approach each of the crossing-point levels to a predetermined signal level; and outputting the sensor signals having the in-phase levels adjusted.

BRIEF DESCRIPTION OF THE SEVERAL VIEWS OF THE DRAWINGS

The aforementioned and other aspects, features, and advantages of the present disclosure would be better understood by reference to the following detailed description when considered in connection with the accompanying drawings, wherein:

FIG. 2 is a table of crossing-point phase detection signals UV, VW, and WU indicating comparison results of processed sensor signals U1, V1, and W1 in a crossing-point phase detection circuit illustrated in FIG. 1;

FIG. 3 is a table of signal selection conditions of a signal selection circuit illustrated in FIG. 1;

Figure 1:
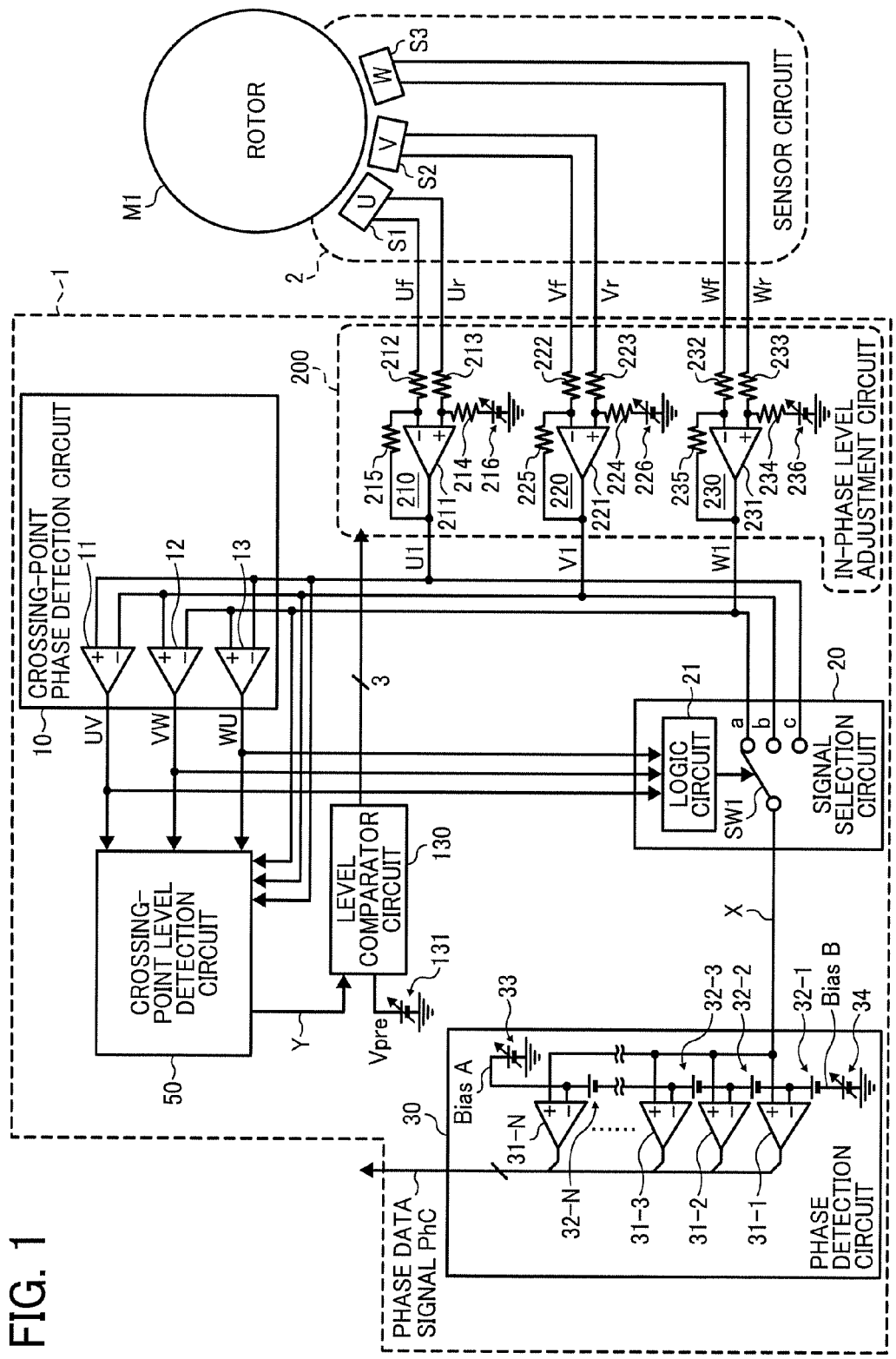
FIG. 1 is a block diagram of a configuration of a phase detector according to a first embodiment of this disclosure, with a motor and a sensor circuit.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

First Embodiment

FIG. 1 is a block diagram of a configuration of a phase detector 1 according to a first embodiment of this disclosure, with a motor M1 and a sensor circuit 2. In FIG. 1, the phase detector 1 includes a crossing-point phase detection circuit 10, a signal selection circuit 20, a phase detection circuit 30, a crossing-point level detection circuit 50, a crossing-point level comparator circuit 130, and an in-phase level adjustment circuit 200. The crossing-point phase detection circuit 10 includes three comparators (Comps) 11, 12, and 13. The signal selection circuit 20 includes a logic circuit 21 and a switch SW1. The phase detection circuit 30 includes a number N of comparators 31-1 to 31-N and a number (N+2) of voltage sources 32-1 to 32-N and variable voltage sources 33 and 34. The in-phase level adjustment circuit 200 includes differential amplifier circuits 210, 220, and 230. The differential amplifier circuit 210 includes a differential amplifier 211, resistors 212 to 215, and a variable voltage source 216. The differential amplifier circuit 220 includes a differential amplifier 221, resistors 222 to 225, and a variable voltage source 226. The differential amplifier circuit 230 includes a differential amplifier 231, resistors 232 to 235, and a variable voltage source 236.

In FIG. 1, the motor M1 is, e.g., a brushless DC motor, and the sensor circuit 2 is disposed around a rotor of the motor M1. The sensor circuit 2 includes sensors S1, S2, and S3 to detect rotation angles of U phase, V phase, and W phase, respectively, of the motor M1 spaced at a predetermined electric angle (e.g., 120°). The sensors S1 to S3 is, e.g., a magnetic sensor including a hall device and detects magnetic flux density varying with the rotation of the motor M1. Sensors S1, S2, and S3 of the sensor circuit 2b generate detection signals Uf, Vf, and Wf of magnetic flux densities of U phase, V phase, and W phase, respectively, and reverse phase signals Ur, Vr, and Wr thereof and input the detection signals Uf, Vf, and Wf and the reverse phase signals Ur, Vr, and Wr to the differential amplifiers 211, 221, and 231 of the in-phase level adjustment circuit 200.

Reference voltage of the variable voltage source 216 is applied to a non-inverting input terminal of the differential amplifier 211 via the resistor 214. An output terminal of the differential amplifier 211 is connected to an inverting input terminal of the differential amplifier 211 via a feedback resistor 215. In the differential amplifier 211, the detection signal Uf from the sensor S1 is input to the inverting input terminal via the resistor 212. The reverse phase signal Ur from the sensor S1 is input to the non-inverting input terminal via the resistor 213. The differential amplifier 211 differentially amplifies the detection signal Uf and the reverse phase signal Ur and outputs the processed sensor signal U1 indicating a result of differential amplification. Reference voltage of the variable voltage source 226 is applied to a non-inverting input terminal of the differential amplifier 221 via the resistor 224. An output terminal of the differential amplifier 221 is connected to an inverting input terminal of the differential amplifier 221 via a feedback resistor 225. In the differential amplifier 221, the detection signal Vf from the sensor S2 is input to the inverting input terminal via the resistor 222. The reverse phase signal Vr from the sensor S2 is input to the non-inverting input terminal via the resistor 223. The differential amplifier 221 differentially amplifies the detection signal Vf and the reverse phase signal Vr and outputs the processed sensor signal V1 indicating a result of differential amplification. Reference voltage of the variable voltage source 236 is applied to a non-inverting input terminal of the differential amplifier 231 via the resistor 234. An output terminal of the differential amplifier 231 is connected to an inverting input terminal of the differential amplifier 231 via a feedback resistor 235. In the differential amplifier 231, the detection signal Wf from the sensor S3 is input to the inverting input terminal via the resistor 232. The reverse phase signal Wr from the sensor S3 is input to the non-inverting input terminal via the resistor 233. The differential amplifier 231 differentially amplifies the detection signal Wf and the reverse phase signal Wr and outputs the processed sensor signal W1 indicating a result of differential amplification.

The in-phase level adjustment circuit 200 outputs processed sensor signals U1, V1, and W1 to the crossing-point phase detection circuit 10, the signal selection circuit 20, and the crossing-point level detection circuit 50 of the phase detector 1. In the crossing-point phase detection circuit 10, the comparator 11 compares a signal level of the processed sensor signal U1 with the processed sensor signal V1 and generates a crossing-point phase detection signal UV indicating a phase (timing) of a crossing point of the processed sensor signals U1 and V1. Like the comparator 11, the comparator 12 compares the processed sensor signal V1 with the processed sensor signal W1 and generates a crossing-point phase detection signal VW indicating a phase of a crossing point of the processed sensor signals V1 and W1. Likewise, the comparator 13 compares the sensor signal W1 with the sensor signal U1 and generates a crossing-point phase detection signal WU indicating a phase of a crossing point of the sensor signals W1 and U1.

FIG. 2 is a table of crossing-point phase detection signals UV, VW, and WU indicating comparison results of processed sensor signals U1, V1, and W1 in the crossing-point phase detection circuit illustrated in FIG. 1. As illustrated in FIG. 2, when the processed sensor signal U1 has a level not less than that of the processed sensor signal V1, the comparator 11 of FIG. 1 generates a crossing-point phase detection signal UV having a high level (Hi). By contrast, when the processed sensor signal U1 has a level less than that of the processed sensor signal V1, the comparator 11 generates a crossing-point phase detection signal UV of a low level (Low). In the same manner as the comparator 11, the comparators 12 and 13 generate binary crossing-point phase detection signals VW and WU, respectively, according to the table of FIG. 2. As described above, the crossing-point phase detection circuit 10 compares respective pairs of the processed sensor signals U1, V1, and W1 and generates the crossing-point phase detection signals UV, VW, and WU indicating the phases of the crossing points of the respective pairs. The comparators 11, 12, and 13 of the crossing-point phase detection circuit 10 output the crossing-point phase detection signals UV, VW, and WU to the signal selection circuit 20 and the crossing-point level detection circuit 50.

FIG. 3 is a table of an example of signal selection conditions of the signal selection circuit 20 illustrated in FIG. 1. In the signal selection circuit 20 of FIG. 1, the processed sensor signals U1, V1, and W1 are input to terminals a, b, and c, respectively, of the switch SW1. The logic circuit 21 controls switching of the terminals a, b, and c of the switch SW1 based on the crossing-point phase detection signals UV, VW, and WU. According to input conditions of the crossing-point phase detection signals UV, VW, and WU illustrated in FIG. 3, the signal selection circuit 20 of FIG. 1 outputs a selection signal X selected from the processed sensor signals U1, V1, and W1 to the phase detection circuit 30.

At the rising or falling of the crossing-point phase detection signal UV, the crossing-point level detection circuit 50 of FIG. 1 detects a signal level of the processed sensor signal U1 or V1 and generates a crossing-point level signal Y which is a signal level of a crossing point of the processed sensor signals U1 and V1. At the rising or falling of the crossing-point phase detection signal VW, the crossing-point level detection circuit 50 detects a signal level of the processed sensor signal V1 or W1 and generates a crossing-point level signal Y that is a signal level of a crossing point of the processed sensor signals V1 and W1. At the rising or falling of the crossing-point phase detection signal WU, the crossing-point level detection circuit 50 detects a signal level of the processed sensor signal W1 or U1 and generates a crossing-point level signal Y that is a signal level of a crossing point of the processed sensor signals W1 and U1. The crossing-point level detection circuit 50 outputs the crossing-point level signals Y of the respective crossing point levels to the crossing-point level comparator circuit 130. The crossing-point level comparator circuit 130 compares each crossing-point level signal Y with a predetermined voltage Vpre of a variable voltage source 131, and control a reference voltage of each of the variable voltage sources 216, 226, and 236 of the in-phase level adjustment circuit 200 in accordance with a signal indicating a result of the comparison.

In the phase detection circuit 30 of FIG. 1, the variable voltage source 33 generates a predetermined voltage BiasA of a crossing point A that has the higher signal level of two adjacent crossing points of the selection signal X. The variable voltage source 34 generates a predetermined voltage BiasB of a crossing point B that has the lower signal level of the two adjacent crossing points of the selection signal X. The voltage sources 32-1 to 32-N are serially connected and inserted between the variable voltage sources 33 and 34, and generate multiple threshold levels from the voltages generated. The comparator 31-$n$ ($n$=1, 2, . . . , N) outputs a high-level binary signal when the level of the selection signal X is not less than a threshold level of the voltage source 32-$n$. By contrast, the comparator 31-$n$ outputs a low-level binary signal when the level of the selection signal X is less than a threshold level of the voltage source 32-$n$. The phase detection circuit 30 outputs each of the binary signals of comparison results of the comparators 31-1 to 31-N as a phase data signal PhC indicating that the motor M1 has rotated to an angle. As described above, with the comparators 31-1 to 31-N, the phase detection circuit 30 detects that the signal level of the selection signal X has reached a threshold level corresponding to a phase of the rotor of the motor M1.

The phase detector 1 having thus configured, as described below, can detect phase data of the rotor of the motor M1 based on the processed sensor signals U1, V1, and W1 from the sensors S1 to S3.

Figure 4:
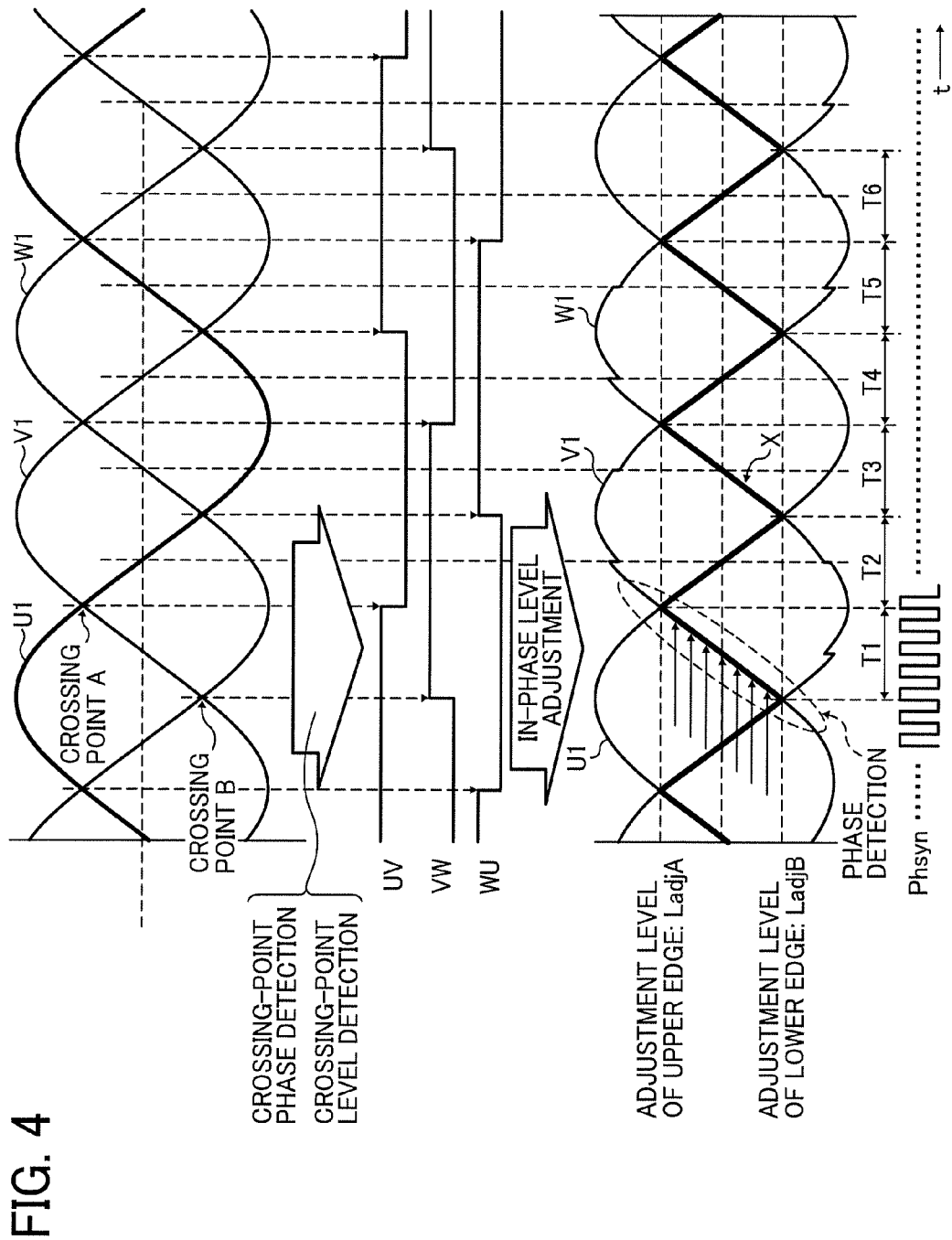
FIG. 4 is a timing chart of signals indicating operation states of the phase detector illustrated in FIG. 1.

FIG. 4 is a timing chart of signals indicating operation states of the phase detector 1 of FIG. 1. In FIG. 4, the processed sensor signals U1, V1, and W1 from the sensors S1, S2, and S3 are indicated by sine waves (alternatively, instead of sine waves, for example, waveforms substantially the same as and in accordance with sine waves may be used), and the U phase, V phase, and W phase of the sensors S1 to S3 are set at intervals of an electric angle of 120°. The phase data signal Phsyn indicates phase data synthesized as a toggle signal by, for example, obtaining an exclusive OR of the phase data signals PhC and the crossing-point phase detection signals UV, VW, and WU.

With the crossing-point phase detection circuit 10, as illustrated in FIG. 2, the crossing-point phase detection signals UV, VW, and WU can be obtained as comparison results between any two of the processed sensor signals U1, V1, and W1. According to the input conditions of FIG. 3, the signal selection circuit 20 selects one of the processed sensor signals U1, V1, and W1 per phase section between crossing-points of the sensor signals U1, V1, and W1 to obtain the selection signal X. The selection signal X thus obtained is a combined, temporally-continuous signal as illustrated by a bold line in a lower part of FIG. 4. As illustrated in FIG. 3, the selection signal X is ideally composed of 1) a time period T1 of a phase section of 60° from 150° to 210° in the sine wave of the processed sensor signal W1, 2) a time period T2 of a section of 60° from −30° to 30° in the sine wave of the processed sensor signal V1, 3) a time period T3 of a phase section of 60° from 150° to 210° in the sine wave of the processed sensor signal U1, 4) a time period T4 of a phase section of 60° from −30° to 30° in the sine wave of the processed sensor signal W1, 5) a time period T5 of a phase section of 60° from 150° to 210° in the sine wave of the processed sensor signal V1, and 4) a time period T6 of a phase section of 60° from −30° to 30° in the sine wave of the processed sensor signal U1. Each of the phase sections of 60° has a higher linearity than in each of phase sections of 60° from 30° to 90°, from 90° to 150°, from 210° to 270°, and from 270° to 310° in the sine wave. In FIG. 4, horizontal arrows attached to the selection signal X indicate the above-described threshold levels. The phase detector 1 detects that the selection signal X has reached a threshold level, and switches two levels of the phase data signal Phsyn.

Figures 5, 6:
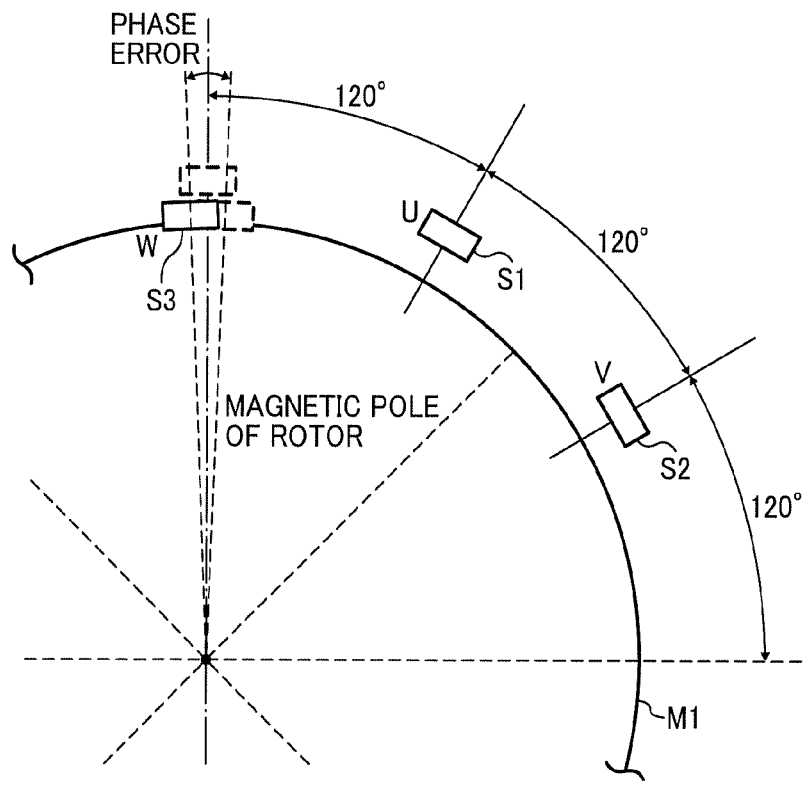
FIG. 5 is a table of electric angle and amplitude ratio of a selection signal X from the signal selection circuit illustrated in FIG. 1.
FIG. 6 is a plan view of the motor mounting sensors S1 to S3 illustrated in FIG. 1.

FIG. 5 is a table of electric angle and amplitude ratio of the selection signal X from the signal selection circuit 20. For example, FIG. 5 shows amplitudes and electric angles obtained when the phase detection circuit 30 divides a section of 60° from −30° to 30° into eight sub-sections of 7.5° each. It is to be noted that the amplitude ratio is normalized by setting an amplitude center level of each of the processed sensor signals U1, V1, and W1 selected to zero (zero cross level) and an amplitude at an electric angle of 90° to 1. The phase detection circuit 30 determines a threshold level based on each amplitude ratio for sine-wave amplitude of the selection signal X illustrated in FIG. 5. It is to be noted that the electric angles −30° and 30° are detectable with the crossing-point phase detection signals UV, VW, and WU, and the threshold levels corresponding to the electric angles −30° and 30° are not necessarily required.

With the phase detector 1 thus configured can detect the phase of the motor M1 based on the processed sensor signals U1, V1, and W1 from the sensors S1 to S3. Here, as described below, the processed sensor signals S1 to S3 may have mounting errors relative to the motor M1. However, the phase detector 1 can correct mounting errors with the in-phase level adjustment circuit 200 and detect the phase of the motor M1.

FIG. 6 is a plan view of the motor M1 mounting the sensors S1 to S3 of FIG. 1. In FIG. 6, the motor M1 is an eight-pole inner rotor that switches eight rotor magnet poles per rotation. The electric angle makes a circuit per passage of two poles of N and S, and an electric angle of 360° corresponds to a motor angle of 90°. The sensors S1 to S3 are ideally arranged at intervals of an electric angle of 120°, which corresponds to a motor angle of 30°. As indicated by the sensor S3 of FIG. 6, a sensor may be shifted from an ideal position by a mounting phase error α. For example, when the sensors S1 to S3 are mounted below an outer periphery of the rotor of the motor M1 having a diameter of 20 mm with a phase error within an electric angle of 1° and the tolerance of phase error is within an electric angle of 1°, 15.7 mm is obtained by dividing a circumferential length 207r of an electric angle of 360° by 4 mm. Accordingly, a required mounting accuracy is 43.6 μm, which is a circumferential length corresponding to the electric angle 1°.

Figure 7:
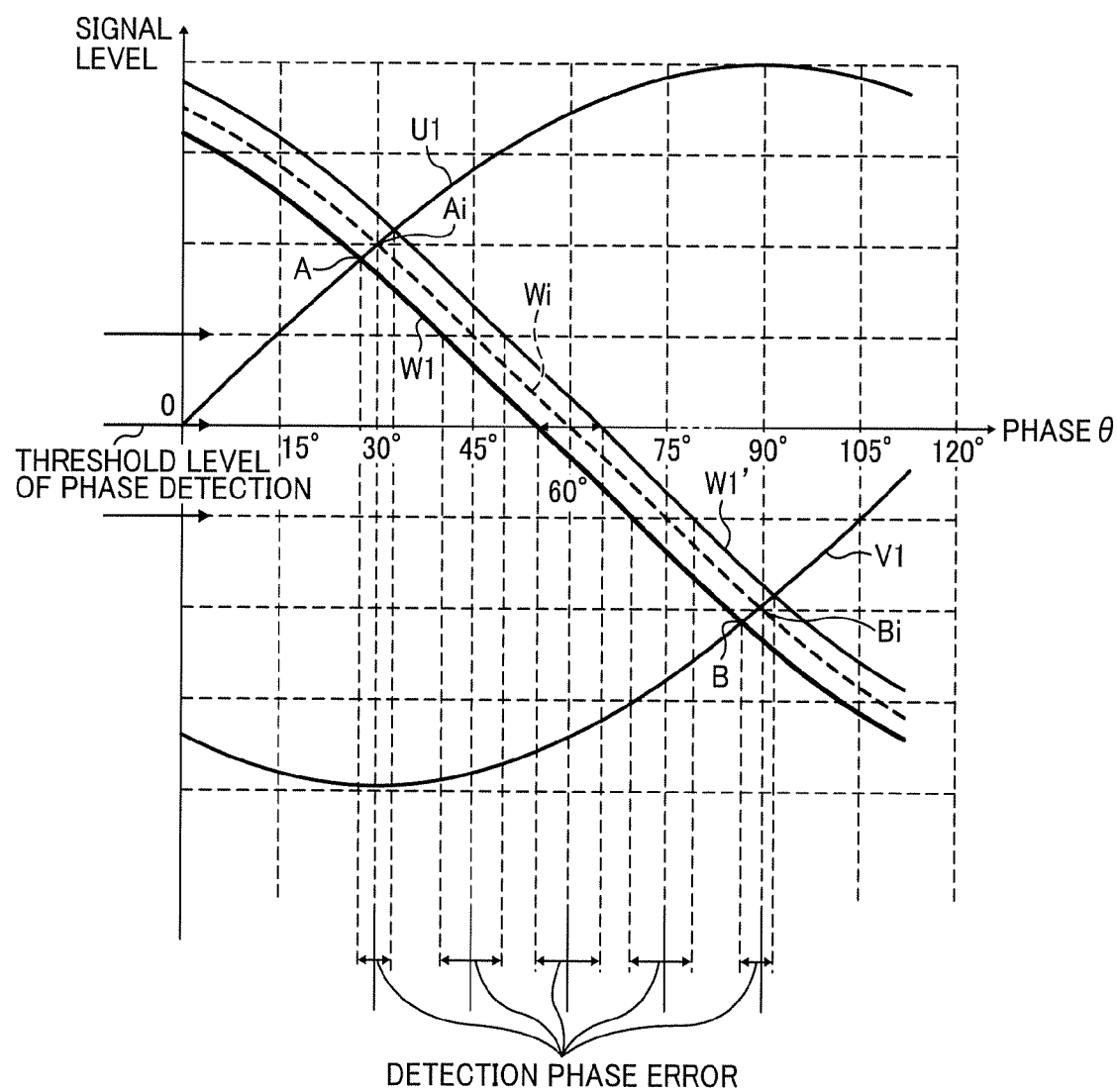
FIG. 7 is a graph of detection phase errors of the sensor S3 illustrated in FIG. 6.

FIG. 7 is a graph of detection phase error of the sensor S3 of FIG. 6. As illustrated in FIG. 7, by comparing a signal level of each of the processed sensor signals U1, V1, and W1 at a phase θ with a threshold level of the comparator 31-n (n=1, 2, . . . , N), a phase corresponding to the threshold level of the comparator 31-n is detected. The phase of the crossing point A is detected with the crossing-point phase detection signal WU illustrated in FIG. 1, and the phase of the crossing point B is detected with the crossing-point detection signal VW illustrated in FIG. 1. An ideal processed sensor signal Wi is obtained by shifting the processed sensor signal U1 by a phase difference of 120° in the arrangement of FIG. 6. As the sensor S3 has a mounting phase error, a phase of processed sensor signal W1 of the sensor S3 proceeds from a phase of the ideal processed sensor signal Wi. The crossing point A of the processed sensor signals U1 and W1 matches a crossing point Ai of the processed sensor signal U1 and the ideal processed sensor signal Wi. A crossing point B of the processed sensor signals V1 and W1 does not match a crossing point Bi of the processed sensor signal V1 and the ideal processed sensor signal Wi. At the zero crossing point of the processed sensor signal W1, the mounting phase error of the sensor S3 directly results in a detection phase error of the phase data. By contrast, the crossing point A has a different signal level from the crossing point Ai of the processed sensor signal U1 and the ideal processed sensor signal Wi, and the detection phase error decreases at the crossing point A. For this embodiment, the crossing point Ai in the ideal sine wave corresponds to an electric angle 30°, and the phase data has a detection phase error of half of the above-described detection phase error at the crossing point A. A processed sensor signal W1' indicates a case in which the sensor S3 has a mounting phase error in an opposite direction, and delays from the ideal processed sensor signal Wi. Hence, the phase detector 1 adjusts the reference voltage of each of the variable voltage sources 216, 226, and 236 to change a signal level (in-phase level) of an amplitude center of each of the processed sensor signals U1, V1, and W1, thus correcting the mounting phase error as described below.

Figure 8:
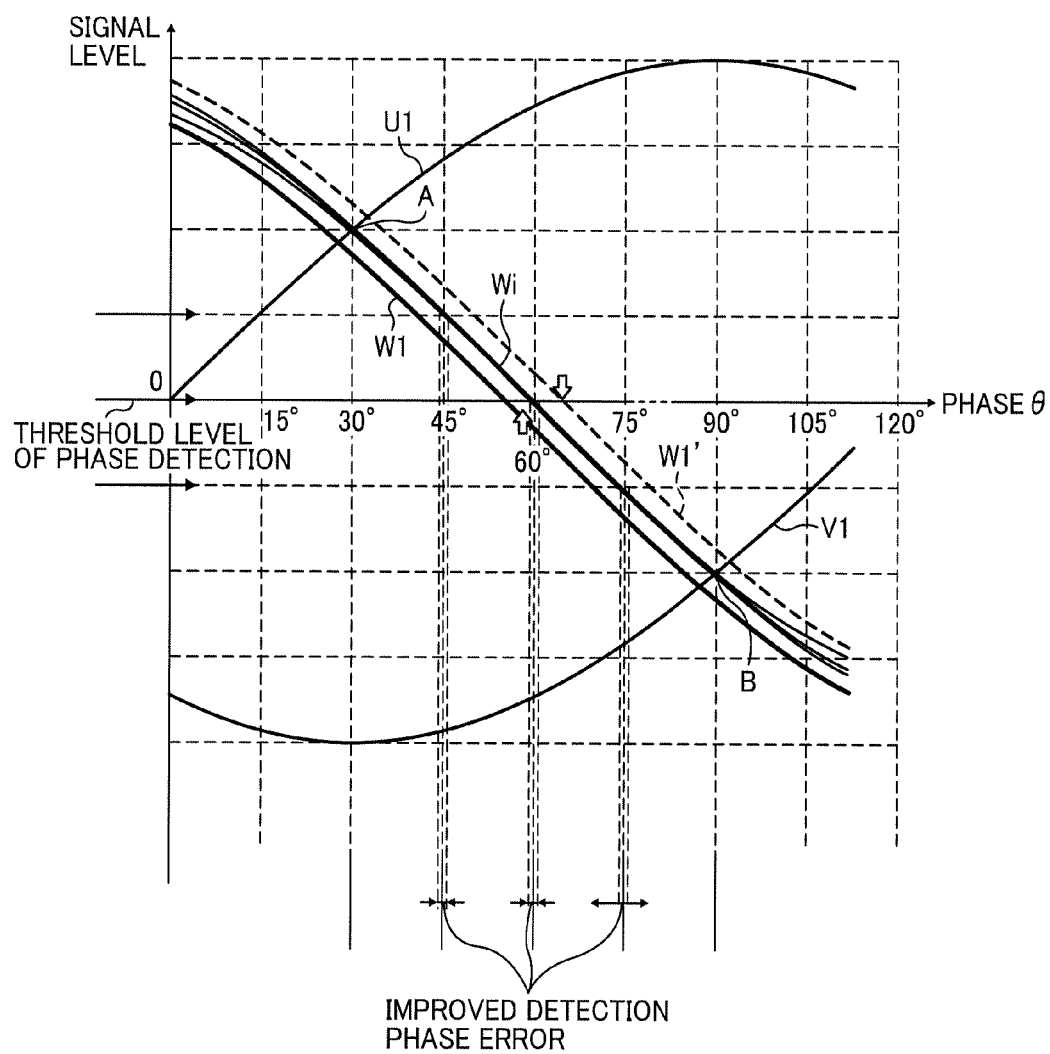
FIG. 8 is a graph of operation of the phase detector to adjust an in-phase level of a processed sensor signal W1 of FIG. 7.

FIG. 8 is a graph of operation of the phase detector 1 to adjust the in-phase level of the processed sensor signal W1 of FIG. 7. In FIG. 8, the sensor signals U1, W1, and V1 are substantially the same as those of FIG. 7. In accordance with a signal from the crossing-point level comparator circuit 130 indicating a result of comparison of crossing point level between the crossing point A of FIG. 7 and the ideal crossing point Ai, the in-phase level adjustment circuit 200 of FIG. 1 adjusts the in-phase level so that, as illustrated in FIG. 8, the crossing point A matches the crossing point Ai, and outputs the processed sensor signal W1 adjusted. The phase of the processed sensor signal W1 more proceeds than the phase of the ideal sensor processed signal, and the crossing-point level of the crossing point A is lower than the crossing-point level of the ideal crossing point Ai. Hence, the in-phase level adjustment circuit 200 outputs the processed sensor signal W1 having an increased in-phase level illustrated in FIG. 8. By contrast, the phase of the processed sensor signal W1 of FIG. 7 delays relative to ideal sensor processed signal, and the crossing-point level of the crossing point A is higher than the crossing-point level of the ideal crossing point Ai. Hence, the in-phase level adjustment circuit 200 outputs the processed sensor signal W1' having a decreased in-phase level illustrated in FIG. 8.

Such adjustment of the in-phase level of the processed sensor signal W1 provides the selection signal X having a signal level closer to the ideal processed sensor signal Wi than before adjustment. Accordingly, the detection phase error at the crossing point A can be reduced, and detection phase errors at other threshold levels are improved relative those of FIG. 7. For example, when the sensor S2 has no mounting phase error, adjusting the in-phase level of the processed sensor signal W1 at the crossing point A allows the crossing-point level of the crossing point B to approach the ideal crossing point Bi simultaneously. In FIGS. 6 through 8, the examples in which only the sensor S3 has a mounting phase error are described above. However, for example, when the sensor S2 has a mounting phase error, in-phase level adjustment substantially the same as the adjustment of the processed sensor signal W1 illustrated in FIGS. 6 through 8 is performed on the processed sensor signal V1 with reference to the processed sensor signal U1.

Figure 9:
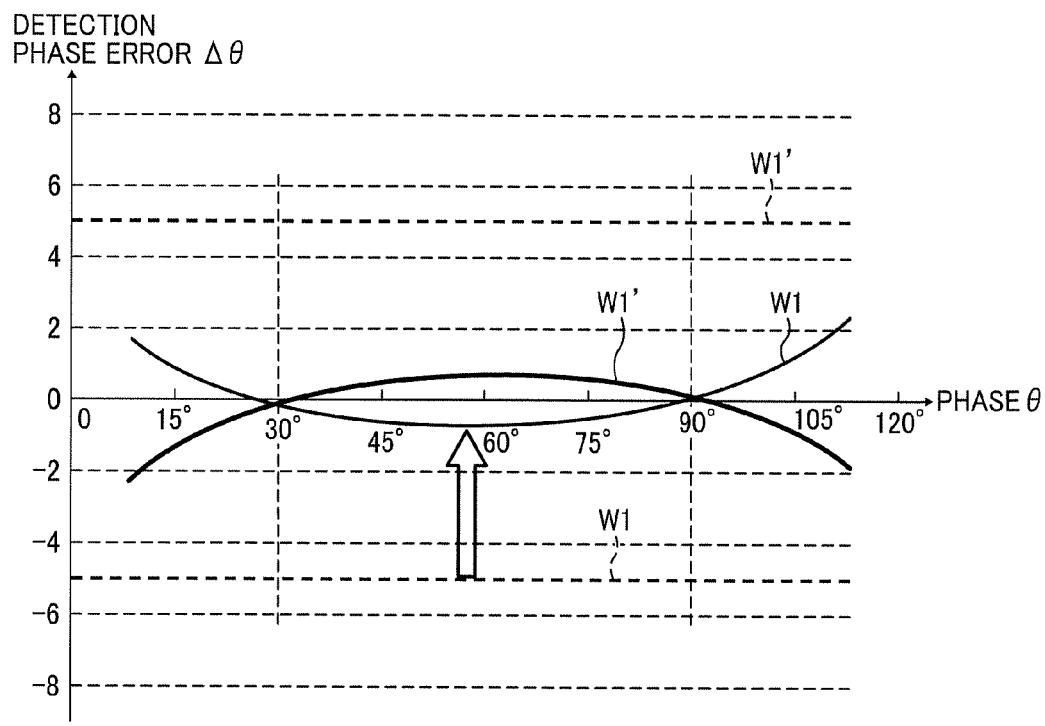
FIG. 9 is a graph of detection phase errors before and after the in-phase level adjustment of the processed sensor signal W1 illustrated in FIG. 8.

FIG. 9 is a graph of detection phase errors before and after the in-phase level adjustment of the processed sensor signal W1 illustrated in FIG. 8. FIG. 9 shows detection phase error Δθ relative to the phase θ of the processed sensor signal W1 illustrated in FIG. 8. When the sensor S3 has a mounting phase error of 5°, the detection phase error is 5° at maximum as illustrated in FIG. 7. By contrast, conducting the in-phase level adjustment in this embodiment reduces the detection phase error to 0.7° at minimum as illustrated in FIG. 9, and the accuracy of phase detection is increased to a detection accuracy of less than 1°.

For the phase detector 1 according to this embodiment thus configured, the phase data signals PhC and Phsyn are generated based on the processed sensor signals U1, V1, and W1 having signal levels corresponding to rotational positions of the rotor of the motor M1 including multiple coils. The phase detector 1 includes the crossing-point phase detection circuit 10, the crossing-point level detection circuit 50, the signal selection circuit 20, the phase detection circuit 30, and the in-phase level adjustment circuit 200. The crossing-point phase detection circuit 10 compares respective pairs of the processed sensor signals U1, V1, and W1, and generates and outputs the crossing-point phase detection signals UV, VW, and WU indicating the phases of the crossing points of the respective pairs. The crossing-point level detection circuit 50 detects crossing-point levels which are signal levels of the above-described crossing points, and generates and outputs crossing-point level signals Y indicating the crossing-point levels detected. The signal selection circuit 20 selects one selection signal X from the processed sensor signals U1, V1, and W1. The phase detection circuit 30 detects that the signal level of the selection signal X selected by the signal selection circuit 20 has reached a threshold level corresponding to a predetermined phase of the rotor, and outputs a phase data signal PhC indicating a phase corresponding to the threshold level that the selection signal X has reached. The in-phase level adjustment circuit 200 adjusts and outputs the in-phase levels of the processed sensor signals U1, V1, and W1 to approach each crossing-point level to a signal level LadjA or LadjB.

The phase detector 1 according to this embodiment can enhance the detection accuracy of rotation phases while reducing additional cost as compared to a conventional technology. In a section having good linearity in the processed sensor signals U1, V1, and W1 from the sensors S1 to S3, the phase detection circuit 30 compares the signal levels with multiple threshold levels, thus allowing detection of phase data of the rotor of the motor M1. Even if the processed sensor signals S1 to S3 have mounting errors relative to the motor M1, the phase detector 1 can correct the mounting errors with the in-phase level adjustment circuit 200 to detect the phase of the motor M1.

The sensors S1 to S3 serving as magnetic sensors to detect the rotor of the motor M1 are, for example, hall elements, and the magnetic flux density generated by rotation of the rotor is likely to be a sine wave. In other words, signals from the magnetic sensors are also likely to be sine waves. However, the magnetic flux density generated during rotation of the rotor and received by the magnetic sensors fixed may not always be a smooth sine wave illustrated in FIG. 8 but may be a distorted sine wave. The magnetic flux density may exceed an acceptable value of the magnetic sensor and cause magnetic saturation. As a result, the output of magnetic sensor may saturate and has a shape similar to a trapezoidal wave. By contrast, the phase detector 1 can detect a phase in a nearly-straight portion of each sensor signal, such as a portion (e.g., a phase section of ±30° in sine wave) in which a waveform between two adjacent crossing points of each sensor signal is more inclined than a phase section between other crossing-points. In other words, the phase detector 1 can detect a phase in a substantially linear portion. For example, multiple phases can be detected by using the phase detector 1 in a section of electric angles of −60° to 60° and a section of electric angles of 120° to 240° of a signal having a sine wave or a waveform close to the sine wave. Furthermore, the in-phase level adjustment circuit 200 according to this embodiment adjusts the in-phase levels of the processed sensor signals U1, V1, and W1, thus enhancing the accuracy of the phase detection.

In FIG. 3, the selection signal X is obtained from the section of −30° to 30° or 150° to 210° in the sine wave of each of the processed sensor signals U1, V1, and W1, and is a continuous signal even when the phase section is switched and the processed sensor signal selected changes. For the phase data signals PhC from the phase detection circuit 30, binary signals of adjacent comparison results from the comparators 31-1 to 31-N switch in turn, thus allowing a final synthesized signal to be a gray code. FIG. 5 shows a way for obtaining phase data per electric angle of 7.5°. However, the table of FIG. 5 is an example, and the way for obtaining phase data is not limited to the table of FIG. 5. For example, in some embodiments, phase data is obtained for amplitude ratios each having an electric angle of 6°. In some embodiments, by dividing a section into sub-sections each having an electric angle of 3°, phase data can be obtained 2.5 times as much as the phase data per electric angle of 7.5°.

Second Embodiment

Figure 10:
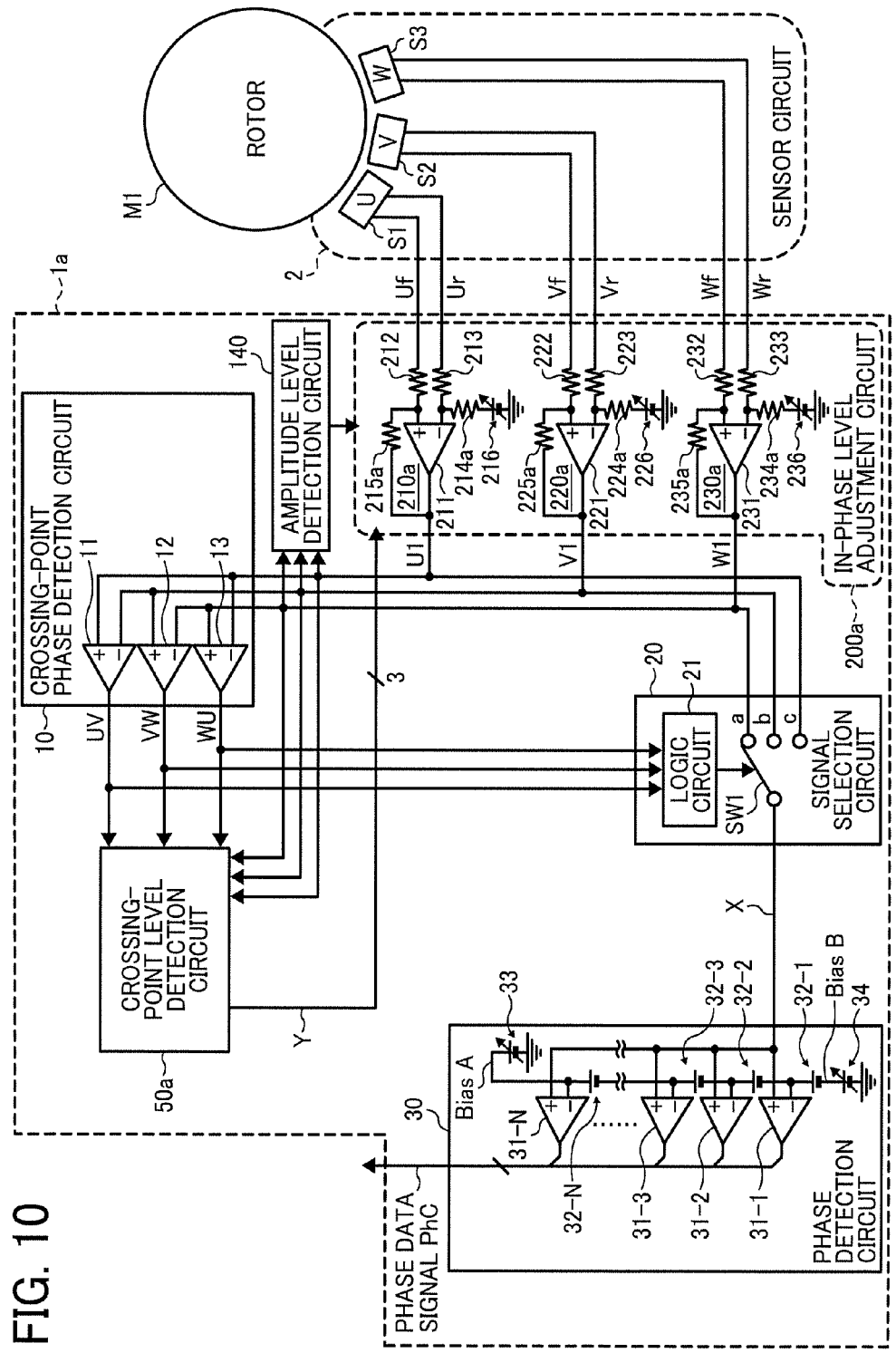
FIG. 10 is a block diagram of a configuration of a phase detector according to a second embodiment of this disclosure, with a motor and a sensor circuit.
Figure 11:
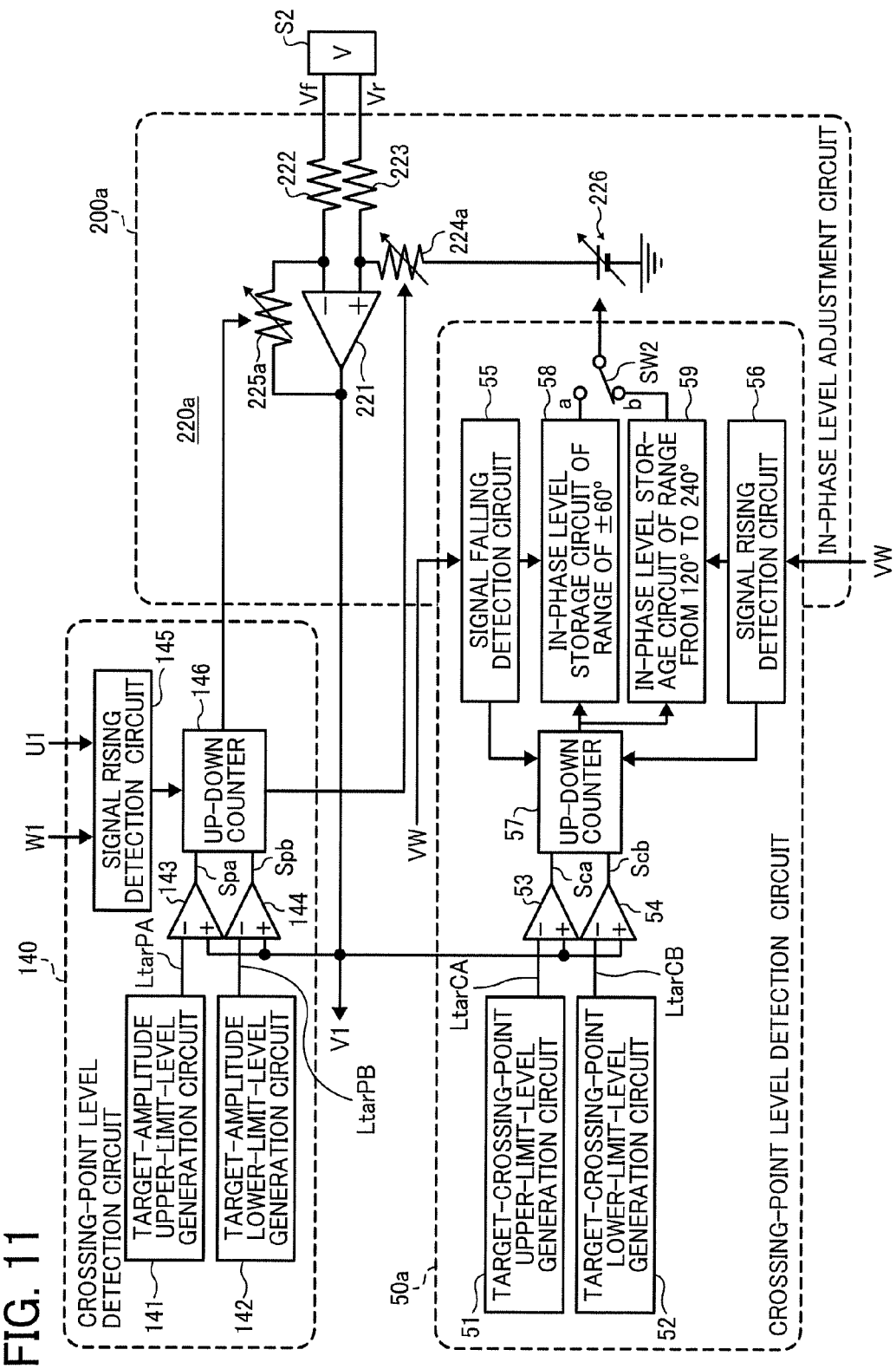
FIG. 11 is a block diagram of a configuration of an amplitude level detection circuit and a crossing-point level detection circuit illustrated in FIG. 10.

FIG. 10 is a block diagram of a configuration of a phase detector 1a according to a second embodiment of this disclosure, with a motor M1 and a sensor circuit 2. FIG. 11 is a block diagram of a configuration of the amplitude level detection circuit 140 and a crossing-point level detection circuit 50a illustrated in FIG. 10. The phase detector 1a according to the second embodiment differs from the phase detector 1 according to the first embodiment in that the phase detector 1a includes an in-phase level adjustment circuit 200a and the crossing-point level detection circuit 50a instead of the in-phase level adjustment circuit 200, the crossing-point level detection circuit 50, and the crossing-point level comparator circuit 130. The phase detector 1a also differs from the phase detector 1 according to the first embodiment in that the phase detector 1a includes the amplitude level detection circuit 140. The difference is described below.

In FIG. 10, the in-phase level adjustment circuit 200a differs from the in-phase level adjustment circuit 200 in that the in-phase level adjustment circuit 200a includes differential amplifier circuit 210a, 220a, and 230a instead of the differential amplifier circuits 210, 220, and 230. The differential amplifier circuit 210a also differs from the differential amplifier circuit 210 in that the differential amplifier circuit 210a includes variable resistors 214a and 215a instead of the resistors 214 and 215. Like the differential amplifier circuit 210a, the differential amplifiers 220a and 230a include variable resistors 224a and 225a and variable resistors 234a and 235a, respectively. In accordance with processed sensor signals U1, V1, and W1 from the in-phase level adjustment circuit 200a, the amplitude level detection circuit 140 detects peak values of signal levels of the processed sensor signals U1, V1, and W1. The amplitude level detection circuit 140 controls gains (amplification factor) of the differential amplifier circuits 210a, 220a, and 230a in accordance with signals indicating the peak values detected.

In the same manner as that of the crossing-point level detection circuit 50 according to the first embodiment, the crossing-point level detection circuit 50a detects crossing-point levels of crossing points between respective pairs of the sensor signals U1, V1, and W1 based on timing of crossing-point detection signals UV, VW, and WU. The crossing-point level detection circuit 50a also controls the reference voltage of each of the variable voltage sources 216, 226, and 236 of the in-phase level adjustment circuit 200 in accordance with each crossing-point level detected.

FIG. 11 illustrates a configuration of adjusting the amplitude level and in-phase level of the processed sensor signal V1 of the processed sensor signals U1, V1, and W1. The amplitude level detection circuit 140 of FIG. 11 includes a target-amplitude upper-limit-level generation circuit 141, a target-amplitude lower-limit-level generation circuit 142, comparators 143 and 144, a signal rising detection circuit 145, and an up-down counter 146. The crossing-point level detection circuit 50a includes a target-crossing-point upper-limit-level generation circuit 51, a target-crossing-point lower-limit-level generation circuit 52, comparators 53 and 54, a signal rising detection circuit 55, a signal falling detection circuit 56, and an up-down counter 57. The crossing-point level detection circuit 50a includes in-phase level storage circuits 58 and 59 and a switch SW2.

In FIG. 11, the target-amplitude upper-limit-level generation circuit 141 of the amplitude level detection circuit 140 generates a target-amplitude upper-limit level LtarPA having a signal level higher than a target value of the amplitude level of the processed sensor signal V1 by a predetermined peimissible error and outputs the target-amplitude upper-limit level LtarPA to an inverting input terminal of the comparator 143. The target-amplitude lower-limit-level generation circuit 142 generates a target-amplitude lower-limit level LtarPB having a signal level lower than the target value of the amplitude level of the processed sensor signal V1 by a predetermined permissible error and outputs the target-amplitude lower-limit level LtarPB to an inverting input terminal of the comparator 144.

When the signal level of the processed sensor signal V1 input to the non-inverting input terminal is not lower than the target-amplitude upper-limit level LtarPA, the comparator 143 generates a comparison signal Spa of high level and outputs the comparison signal Spa to the up-down counter 146. By contrast, when the signal level of the processed sensor signal V1 is lower than the target-amplitude upper-limit level LtarPA, the comparator 143 generates a comparison signal Spa of low level and outputs the comparison signal Spa to the up-down counter 146. When the signal level of the processed sensor signal V1 input to the non-inverting input terminal is not lower than the target-amplitude lower-limit level LtarPB, the comparator 144 generates a comparison signal Spb of high level and outputs the comparison signal Spb to the up-down counter 146. By contrast, when the signal level of the processed sensor signal V1 is lower than the target-amplitude lower-limit level LtarPB, the comparator 144 generates a comparison signal Spb of low level and outputs the comparison signal Spb to the up-down counter 146.

Based on the processed sensor signals W1 and U1, the signal rising detection circuit 145 detects rising of the crossing-point phase detection signal WU illustrated in FIG. 10, and enables counting of the up-down counter 146 on rising of the crossing-point phase detection signal WU. The up-down counter 146 counts up when both of the comparison signals Spa and Spb are of high level, counts down when both of the comparison signals Spa and Spb are of low level, and maintains the count otherwise. The up-down counter 146 changes resistance values of resistors 225a and 226a so that gain of the differential amplifier circuit 220a increases and decreases in accordance with signals indicating counting results.

The target-crossing-point upper-limit-level generation circuit 51 of the crossing-point level detection circuit 50a generates a target-crossing-point upper-limit level LtarCA having a signal level higher than a target value of a crossing-point level of the processed sensor signal V1 by a predetermined permissible error and outputs the target-crossing-point upper-limit level LtarCA to an inverting input terminal of the comparator 53. The target-crossing-point lower-limit-level generation circuit 52 generates a target-crossing-point lower-limit level LtarCB having a signal level lower than the target value of the crossing-point level of the processed sensor signal V1 by a predetermined permissible error and outputs the target-crossing-point lower-limit level LtarCB to an inverting input terminal of the comparator 54.

When the signal level of the processed sensor signal V1 input to the non-inverting input terminal is not lower than the target-crossing-point upper-limit level LtarCA, the comparator 53 generates a comparison signal Spa of high level and outputs the comparison signal Sca to the up-down counter 57. By contrast, when the signal level of the processed sensor signal V1 is lower than the target-crossing-point upper-limit level LtarCA, the comparator 53 generates a comparison signal Sca of low level and outputs the comparison signal Sca to the up-down counter 57. When the signal level of the processed sensor signal V1 input to the non-inverting input terminal is not lower than the target-crossing-point lower-limit level LtarCB, the comparator 54 generates a comparison signal Scb of low level and outputs the comparison signal Scb to the up-down counter 57. By contrast, when the signal level of the processed sensor signal V1 is lower than the target-crossing-point lower-limit level LtarCB, the comparator 54 generates a comparison signal Scb of low level and outputs the comparison signal Scb to the up-down counter 57.

The signal falling detection circuit 55 detects falling of the crossing-point phase detection signal VW from the crossing-point phase detection circuit 10 of FIG. 10, and enables operations of the up-down counter 57 and the in-phase level storage circuit 58 on falling of the crossing-point phase detection signal VW. The signal falling detection circuit detects rising of the crossing-point phase detection signal VW from the crossing-point phase detection circuit 10, and enables operations of the up-down counter 57 and the in-phase level storage circuit 59 on rising of the crossing-point phase detection signal VW.

The up-down counter 57 counts up when both of the comparison signals Sca and Scb are of high level, counts down when both of the comparison signals Sca and Scb are of low level, and maintains the count otherwise. The up-down counter 57 outputs counting results to the in-phase level storage circuits 58 and 59. Each of the in-phase level storage circuits 58 and 59 stores a counting result of the up-down counter 57 and outputs a signal indicating the result stored to a terminal a or b of the switch SW2. The switch SW2 is controlled to select the terminal a in a phase section from −60° to 60° in the processed sensor signal V1, select the terminal b in a phase section from 120° to 240° in the processed sensor signal V1, and otherwise be turned off. The crossing-point level detection circuit 50a controls voltage of the variable voltage source 226 in accordance with selection results of the switch SW2.

In the phase detector 1 thus configured, the amplitude level detection circuit 140 of FIG. 11 decreases the gain of the voltage source of the differential amplifier circuit 220a when the processed sensor signal V1 is not lower than the target-amplitude upper-limit level LtarPA. By contrast, when the processed sensor signal V1 is lower than the target-amplitude lower-limit level LtarPB, the amplitude level detection circuit 140 increases the gain of the voltage source of the differential amplifier circuit 220a Thus, the amplitude of the processed sensor signal V1 is adjusted to fall within a predetermined permissible error range from a target value of the amplitude level. When the processed sensor signal V1 is not lower than the target-crossing-point upper-limit level LtarCA, the crossing-point level detection circuit 50a decreases voltage of the variable voltage source 226. By contrast, when the processed sensor signal V1 is lower than the target-crossing-point lower-limit level LtarCB, the crossing-point level detection circuit 50a increases voltage of the variable voltage source 226. Thus, the in-phase level of the processed sensor signal V1 is adjusted to fall within a predetermined permissible error range from a target value of the crossing-point level. Based on the signals indicating the counting results stored in the in-phase level storage circuits 58 and 59, the crossing-point level detection circuit 50a conducts the above-described in-phase level adjustment on the phase section from −60° to 60° and the phase section from 120° to 240° separately.

Figure 12:
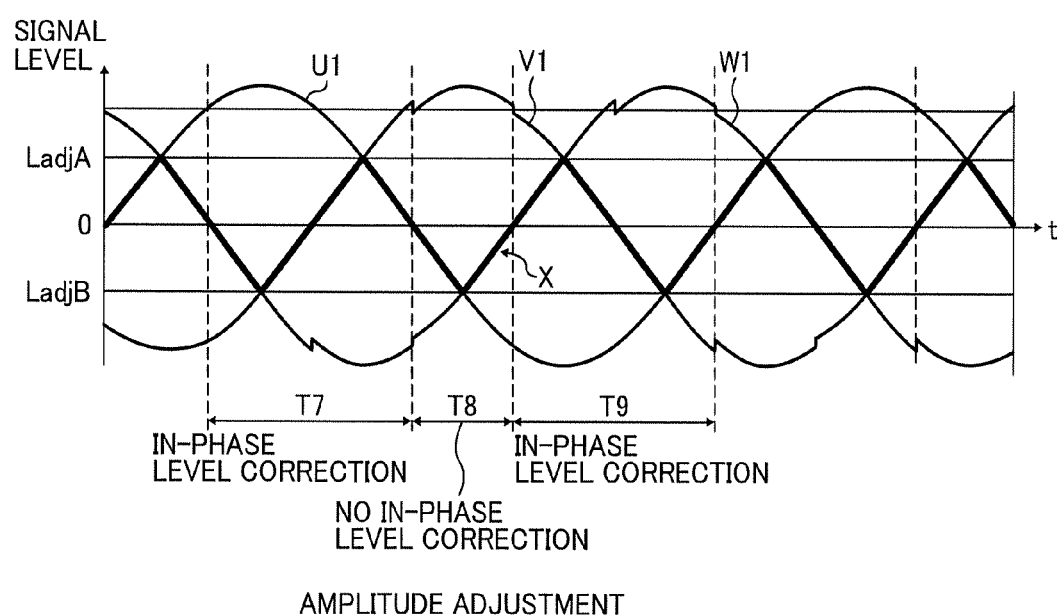
FIG. 12 is a timing chart of signals indicating operation states of the phase detector illustrated in FIG. 10.
Figure 13:
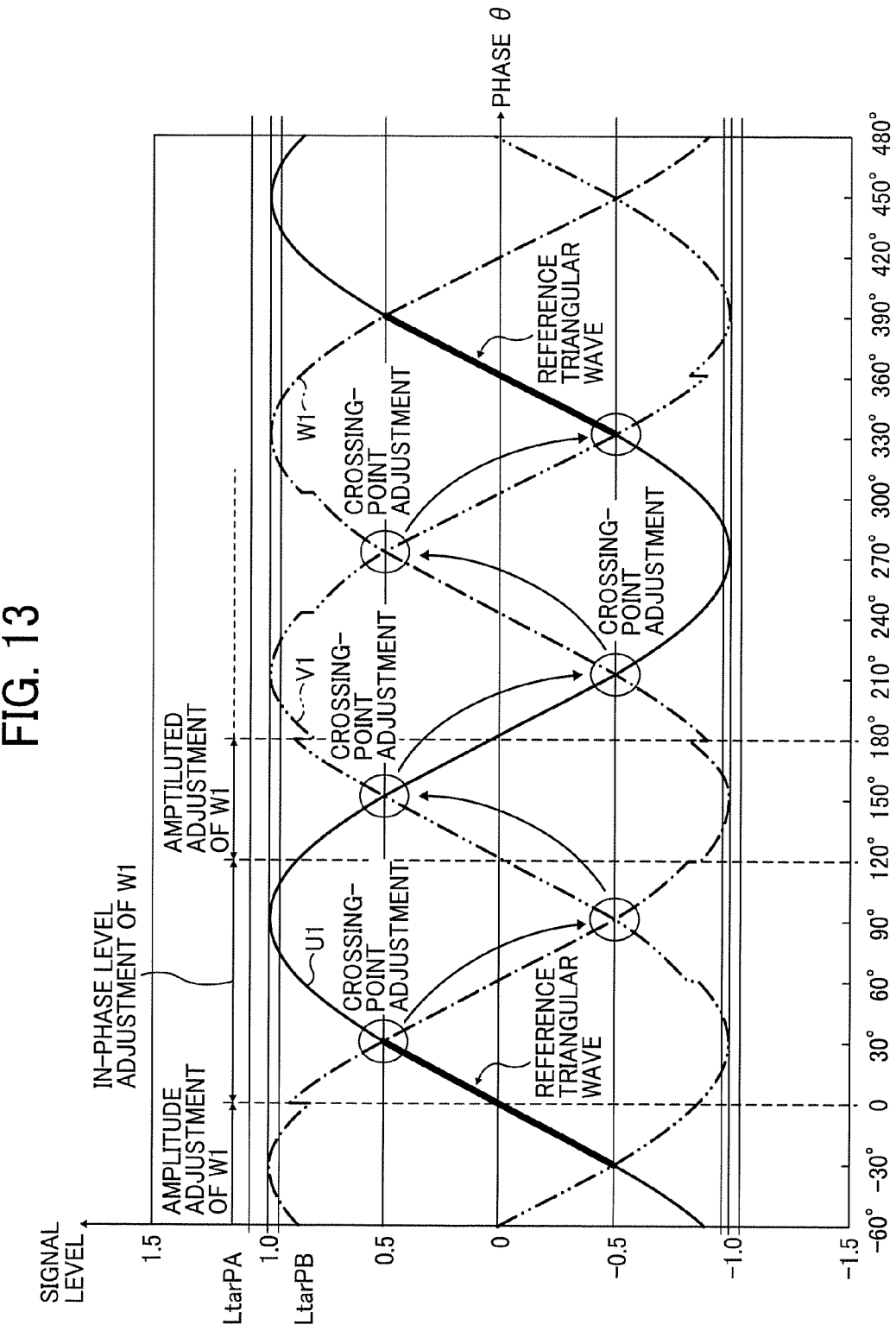
FIG. 13 is a graph of operation of the phase detector of FIG. 10.

FIG. 12 is a timing chart of signals indicating operation states of the phase detector 1 of FIG. 10. FIG. 13 is a graph of operation of the phase detector 1a of FIG. 10.

In a time period T7 of FIG. 12, the processed sensor signal V1 is in an area of the phase section from −60° to 60° and includes an area of the phase section from −30° to 30° in which the processed sensor signal V1 becomes the selection signal X Referring to an adjustment level LadjB at a lower edge of the selection signal X as a target value of the crossing-point level, the crossing-point level detection circuit 50a adjusts the in-phase level of the processed sensor signal V1 in accordance with the signal stored in the in-phase level storage circuit 58. Then, in a time period T8, the processed sensor signal V1 in an area of the phase section from 60° to 120° and includes a peak value of the processed sensor signal V1. At this time, the in-phase level adjustment circuit 200a outputs a processed sensor signal V1 in which the in-phase level is at a default value. A timing of the peak value of the processed sensor signal V1 and a timing of the crossing-point of the processed sensor signals U1 and W1 are ideally the same. Accordingly, by detecting the timing of the crossing-point of the processed sensor signals U1 and W1 at the time period T8 with the amplitude level detection circuit 140, the peak value of the processed sensor signal V1 can be easily detected to adjust the amplitude. Then, in a time period T9, the processed sensor signal V1 is in an area of the phase section from 120° to 240° and includes an area of the phase section from 150° to 210° in which the processed sensor signal V1 becomes the selection signal X. Referring to an adjustment level LadjA at an upper edge of the selection signal X as a target value of the crossing-point level, the crossing-point level detection circuit 50a adjusts the in-phase level of the processed sensor signal V1 in accordance with the signal stored in the in-phase level storage circuit 59. Likewise, with a configuration similar to that of FIG. 11, the in-phase level and the amplitude level of the processed sensor signal W1 are adjusted per phase section. As described above, by switching the in-phase level of the processed sensor signal V1 at each of the time periods T7, T8, and T8, signal adjustment can be conducted to equate the respective crossing-point levels of the selection signal X.

FIG. 13 illustrates a process of signal adjustment of the processed sensor signals U1, V1, and W1. First, when the phase section from −60° to 60° of the processed sensor signal U1 becomes the selection signal X, the phase detector 1a detects the phase of the processed sensor signal U1 and sets a detection result of one edge of a reference triangle wave to a reference for adjusting signal levels of the following processed sensor signals W1 and V1. The selection signal X is changed to the processed sensor signal W1 at a timing of the crossing-point of the processed sensor signals U1 and W1. The in-phase level adjustment circuit 200a performs the above-described in-phase level adjustment of the crossing-point level of the processed sensor signal W1. Then, at each of the crossing-points of the processed sensor signals U1, V1, and W1, the in-phase level adjustment circuit 200a adjusts the in-phase level of one of the processed sensor signals, which becomes the selection signal X from the crossing-point, until the in-phase level arrives again at the phase section from −60° to 60° of the processed sensor signal U1. The amplitude levels of the processed sensor signals W1 and V1 are adjusted with reference to the amplitude level of the processed sensor signal U1. Both the phase section in which the in-phase levels of the processed sensor signals W1 and V1 are adjusted and the phase section in which the amplitude level is detected and adjusted have phase differences as in FIG. 12. At each of the crossing points of the processed sensor signals U1, V1, and W1, the in-phase levels of the following the processed sensor signals are adjusted. Thus, the sensor signals are adjusted so that all of the crossing-point levels coincide.

For the phase detector 1a according to the second embodiment thus configured, the amplitudes of the processed sensor signals U1, V1, and W1 are adjusted based on detection results of the amplitude level detection circuit 140, thus allowing the amplitudes of the processed sensor signals U1, V1, and W1 to be equal to each other. By adjusting the amplitudes of the processed sensor signals U1, V1, and W1 to be equal to each other, the phase detection accuracy of the phase detector 1a can be enhanced. The differential amplifier circuits 210a, 220a, and 230a allows the in-phase level adjustment circuit 200a to serve as both an in-phase level adjuster and an amplitude level adjuster and reduce the circuit area. The in-phase levels of the processed sensor signals are switched between the phase sections divided as illustrated in the time periods T7, T8, and T9 of FIG. 12. Thus, the in-phase level in the phase section from 60° to 120° having a peak value of each of the processed sensor signals U1, V1, and W1 can be maintained to be the default value. Such a configuration can avoid a complicated process of adjusting the amplitude level again in response to adjustment results of the in-phase level, use common target-amplitude upper-limit and lower-limit levels for the processed sensor signals, and reduce the circuit area. At each of the crossing points of the processed sensor signals U1, V1, and W1, the in-phase levels of the following the processed sensor signals are adjusted. Thus, the sensor signals are adjusted so that all of the crossing-point levels coincide.

Variation of Second Embodiment

Figure 14:
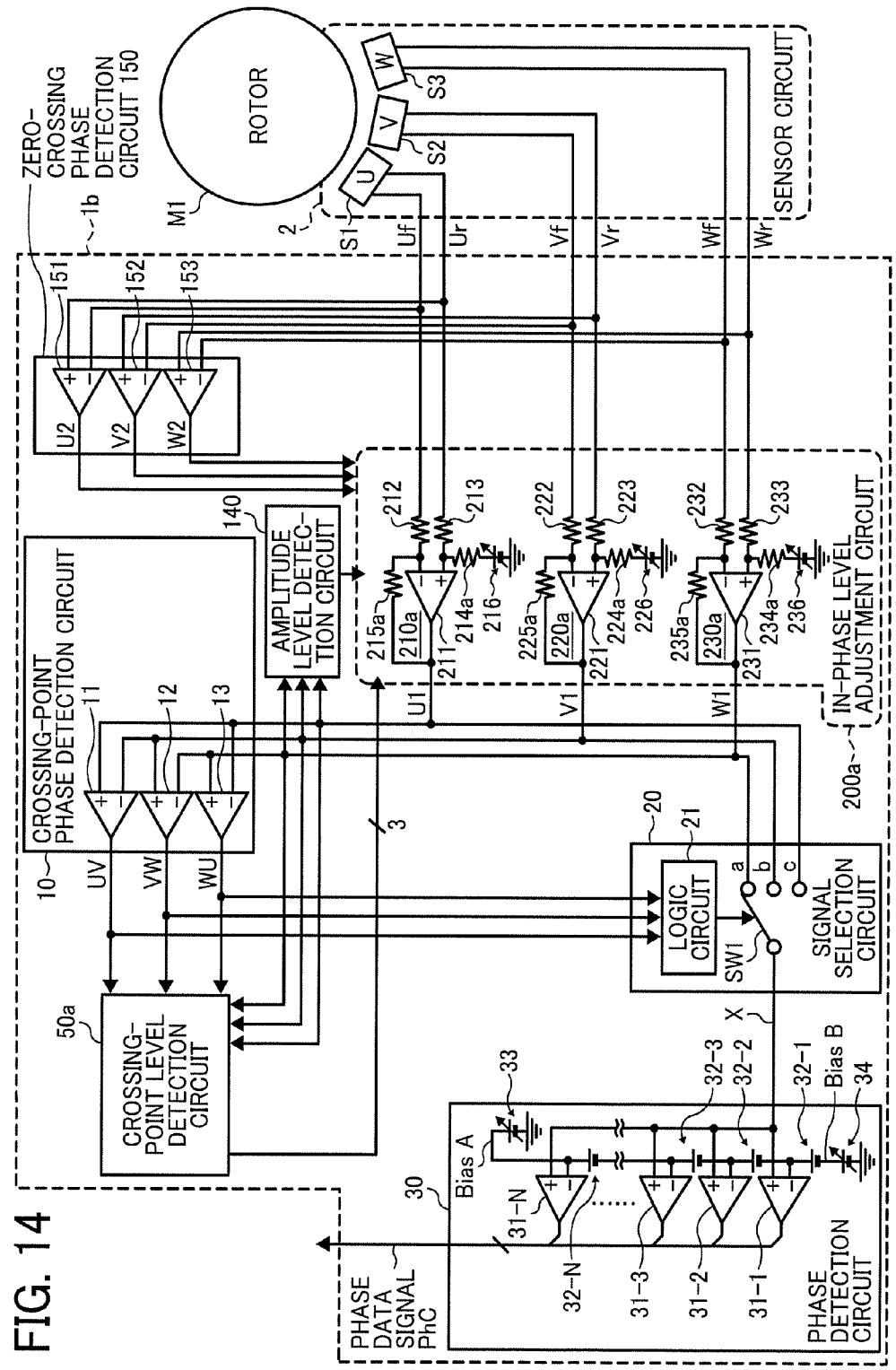
FIG. 14 is a block diagram of a configuration of a phase detector according to a first variation of the second embodiment of this disclosure, with a motor and a sensor circuit.

FIG. 14 is a block diagram of a configuration of a phase detector 1b according to a variation of the second embodiment of this disclosure, with a motor 1\41 and a sensor circuit 2. The phase detector 1b according to the variation of the second embodiment also differs from the phase detector 1a according to the second embodiment in that the phase detector 1b includes a zero-crossing phase detection circuit 150. The difference is described below.

When a signal level of a reverse phase signal Ur input to a non-inverting input terminal is not lower than a signal level of a detection signal Uf input to an inverting input terminal of a comparator 151, the comparator 151 generates a detection signal U2 of high level and outputs the detection signal U2 of high level to an in-phase level adjustment circuit 200a. By contrast, when the signal level of the reverse phase signal Ur is lower than the signal level of the detection signal Uf, the comparator 151 generates a detection signal U2 of low level and outputs the detection signal U2 of low level to the in-phase level adjustment circuit 200a. When a signal level of a reverse phase signal Vr input to a non-inverting input terminal is not lower than a signal level of a detection signal Vf input to an inverting input terminal of a comparator 152, the comparator 152 generates a detection signal V2 of high level and outputs the detection signal V2 of high level to the in-phase level adjustment circuit 200a. By contrast, when the signal level of the reverse phase signal Vr is lower than the signal level of the detection signal Vf, the comparator 152 generates a detection signal V2 of low level and outputs the detection signal V2 of low level to the in-phase level adjustment circuit 200a. When a signal level of a reverse phase signal Wr input to a non-inverting input terminal is not lower than a signal level of a detection signal Wf input to an inverting input terminal of a comparator 153, the comparator 153 generates a detection signal W2 of high level and outputs the detection signal W2 of high level to the in-phase level adjustment circuit 200a. By contrast, when the signal level of the reverse phase signal Wr is lower than the signal level of the detection signal Wf, the comparator 153 generates a detection signal W2 of low level and outputs the detection signal W2 of low level to the in-phase level adjustment circuit 200a. Based on the phase detection signals U2, V2, and W2, the in-phase level adjustment circuit 200a determines phase sections to determine the in-phase levels of the processed sensor signals U1, V1, and W1.

For the phase detector 1b according to the variation of the second embodiment thus configured, the in-phase levels of the processed sensor signals U1, V1, and W1 can be easily determined based on detection results of the zero-crossing phase detection circuit 150 without superimposing the phase sections to adjust the in-phase levels of the processed sensor signals U1, V1, and W1. As illustrated in FIG. 12, the timing of the phase of −60° of the processed sensor signal V1 is ideally the same as that of the zero crossing point of the processed sensor signal W1, and the timing of the phase of 60° is ideally the same as that of the zero crossing point of the processed sensor signal U1. In addition, the timing of the phase of 120° of the processed sensor signal V1 is ideally the same as that of the zero crossing point of the processed sensor signal W1, and the timing of the phase of 240° is ideally the same as that of the zero crossing point of the processed sensor signal U1. Accordingly, adjustment sections of the in-phase levels of the processed sensor signal V1 can be easily determined with the detection signals U2 and W2.

Third Embodiment

Figure 15:
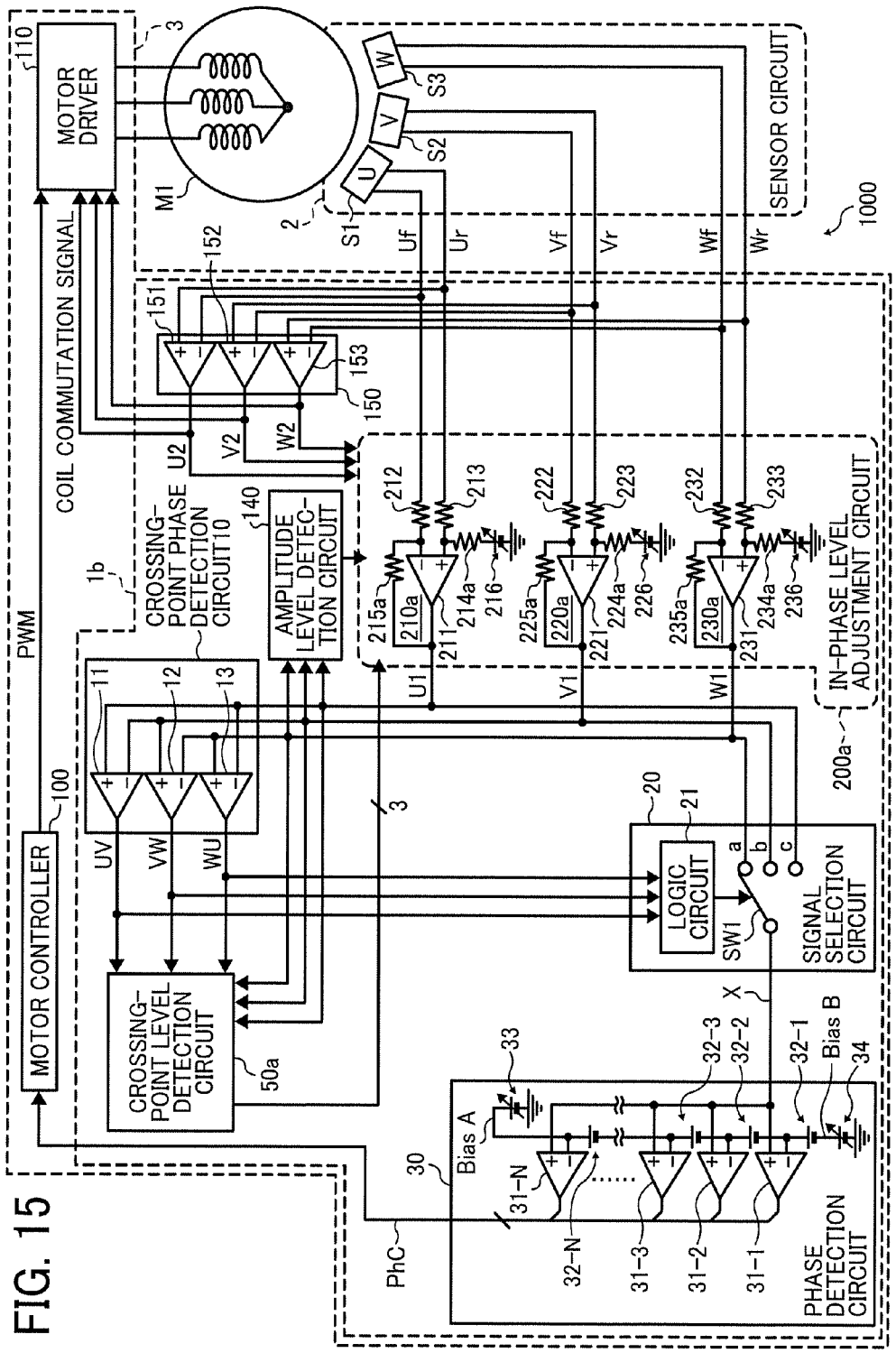
FIG. 15 is a block diagram of a configuration of a motor device according to a third embodiment of this disclosure.

FIG. 15 is a block diagram of a configuration of a motor device 1000 according to a third embodiment of this disclosure. In FIG. 15, the motor device 1000 according to the third embodiment includes a motor M1, a sensor circuit 2, and a motor driving controller 3. The motor driving controller 3 includes the phase detector 1b according to the variation of the second embodiment, a motor controller 100, and a motor driver 110. The motor controller 100 generates a pulse width modulation (PWM) signal based on a phase data signal Phsyn and outputs the PWM signal to the motor driver 110. According to the PWM signal of the motor controller 100, the motor driver 110 selectively applies driving currents to multiple motor coils to rotate a rotor of the motor M1.

Figure 16:
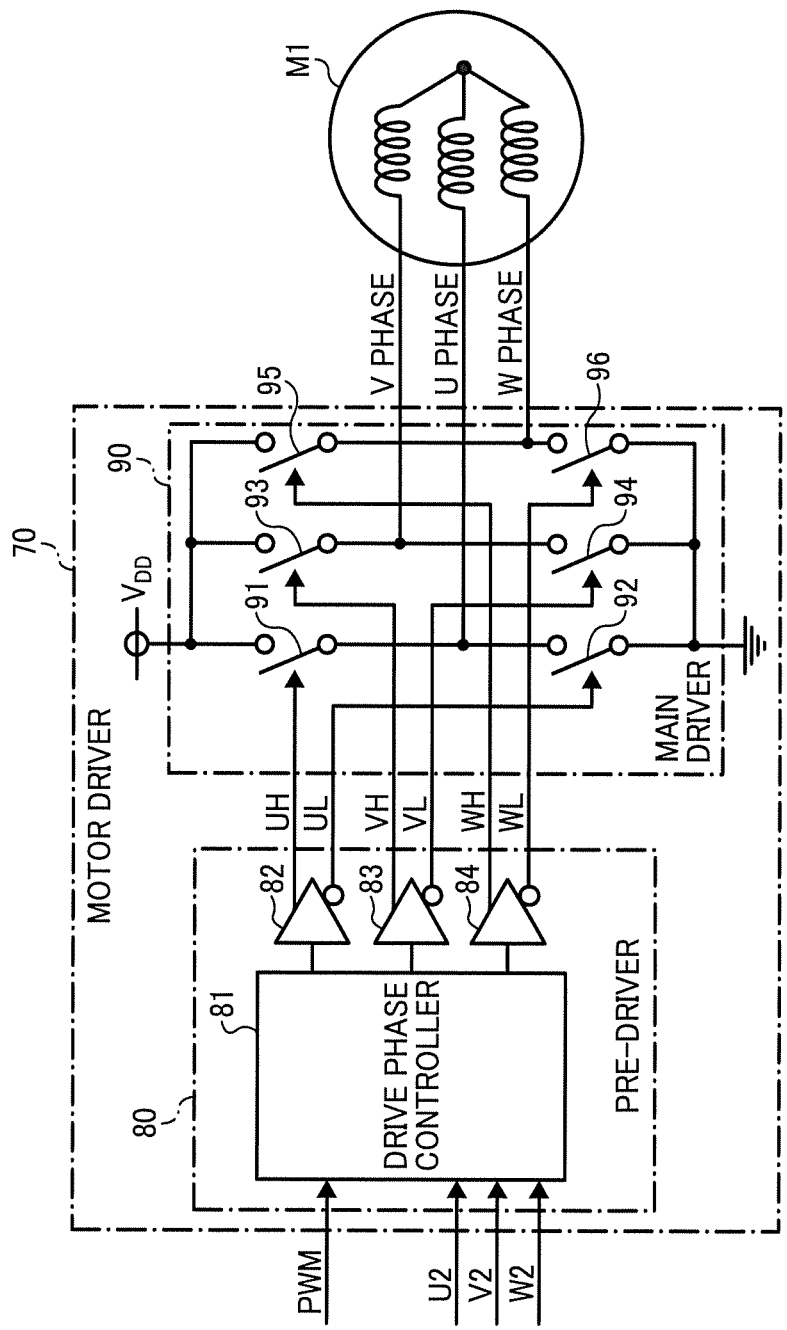
FIG. 16 is a block diagram of a configuration of a motor driver of FIG. 15.

FIG. 16 is a block diagram of a configuration of the motor driver 110 of FIG. 15. In FIG. 16, the motor driver 110 includes a pre-driver 80 and a main driver 90. For example, three-phase coils to drive a brushless DC motor, i.e., the motor M1 are set to U phase, V phase, and W phase, respectively. One end of each of the coils is Y-connected in the motor M1. Here, at the other end of each of the coils, the main driver 90 includes high-side switch elements 91, 93, and 95 connected to a power-supply side and low-side switch elements 92, 94, and 96 connected to a ground side. The pre-driver 80 outputs control signals UH, UL, VH, VL, WH, and WL to drive the switch elements 91, 92, 93, 94, 95, and 96, respectively.

In FIG. 16, the pre-driver 80 includes a driving phase controller 81 and three driving amplifiers 82, 83, and 84. According to the phase detection signals U2, V2, and W2, the driving phase controller 81 selectively outputs the PWM signal sent from the motor controller 100 to any one of the driving amplifiers 82, 83, and 84. According to an output from the driving phase controller 81, the driving amplifier 82 generates a pair of control signals UH and UL, and controls ON/OFF of the high-side switch element 91 with the control signal UH and ON/OFF of the low-side switch element 92 with the control signal UL. According to an output from the driving phase controller 81, the driving amplifier 83 generates a pair of control signals VH and VL, and controls ON/OFF of the high-side switch element 93 with the control signal VH and ON/OFF of the low-side switch element 94 with the control signal VL. According to an output from the driving phase controller 81, the driving amplifier 84 generates a pair of control signals WH and WL and controls ON/OFF of the high-side switch element 95 with the control signal WH and ON/OFF of the low-side switch element 96 with the control signal WL.

Figure 17:
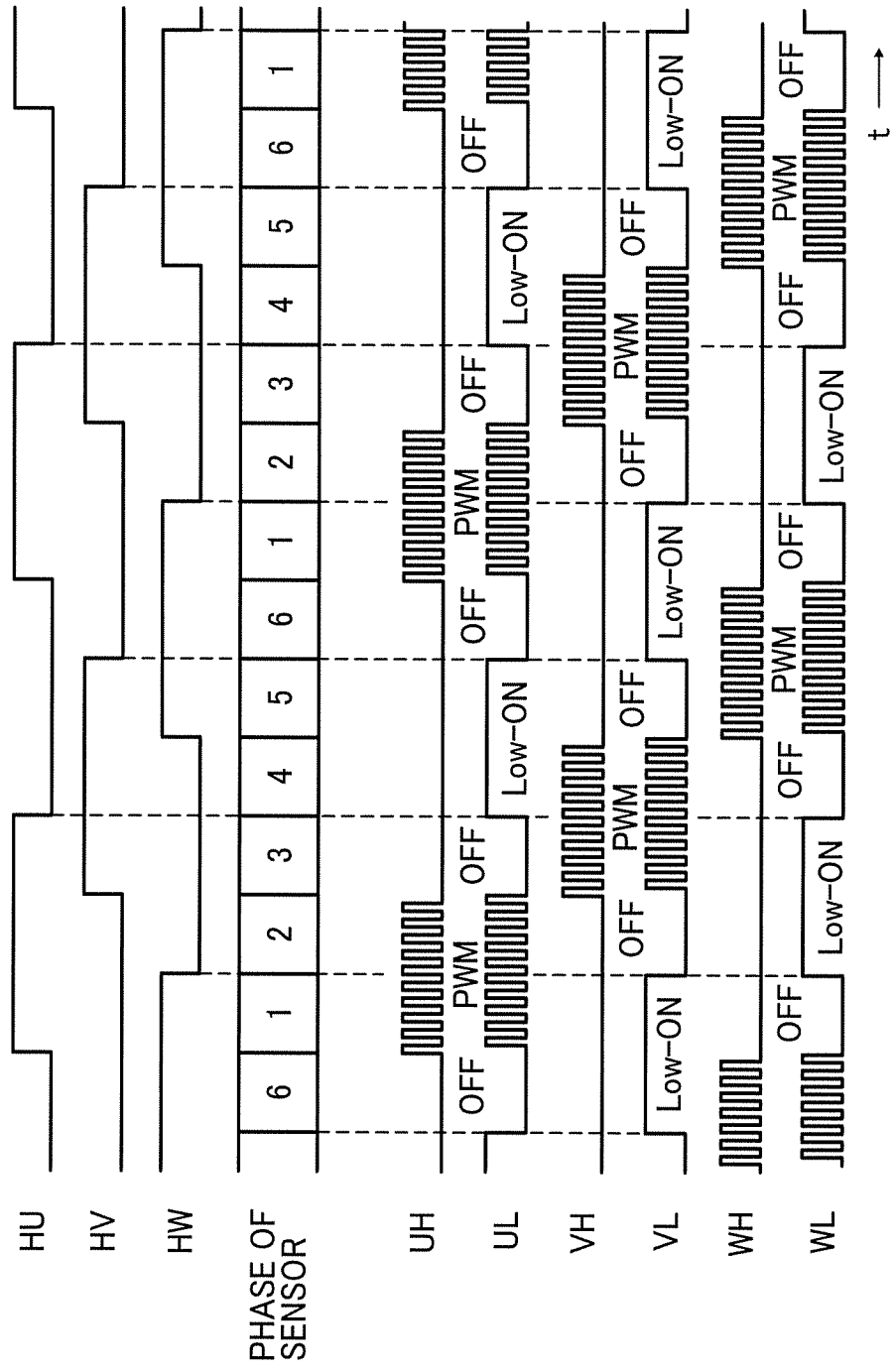
FIG. 17 is a timing charge of control signals indicating operation of the motor driver of FIG. 16.

FIG. 17 is a timing charge of control signals indicating operation of the motor driver 110 of FIG. 16. FIG. 17 shows an example of switching between phases in a signal logic of each of the phase detection signals U2, V2, and W2, which is a typical driving method as a method of driving a brushless DC motor. Based on as accurate as possible phase data of the motor M1 in rotation, the motor controller 100 of FIG. 15 controls a proper duty cycle of the PWM signal and outputs the PWM signal to the motor driver 110. According to the phase detection signals U2, V2, and W2, the driving phase controller 81 of FIG. 13 generates commutation signals HU, HV, and HW indicating whether each of the signal levels of the processed sensor signals U1, V1, and W1 is a zero-crossing level or greater. According to the commutation signals HU, HV, and HW, the driving phase controller 81 performs PWM control on one of the driving amplifiers 82, 83, and 84 and sets a pair of control signals of one of the other two driving amplifiers to the low level. The driving phase controller 81 sets a control signal of the high-side switch element of the remaining one driving amplifier to the low level and a control signal of the low-side switch element of the remaining one driving amplifier to the high level. Thus, the driving phase controller 81 distributes a signal to any one of a phase for synchronizing and rectifying the signal according to a PWM duty cycle, a phase for turning on only a low-side switch element, and a phase for turning off both a high-side switch element and a low-side switch element.

For the motor device according to the third embodiment thus configured, the sensors S1, S2, and S3 can also be used as, for example, sensors for commutation of coil currents for driving the motor M1 constituted of a brushless DC motor, thus obviating additional sensors. In other words, commutation signals of coil currents also generated by sensors of a typical motor device can be used in the motor driving controller 3 to obtain data of multiple phases with the phase detector 1.

Variation of Third Embodiment

Figure 18:
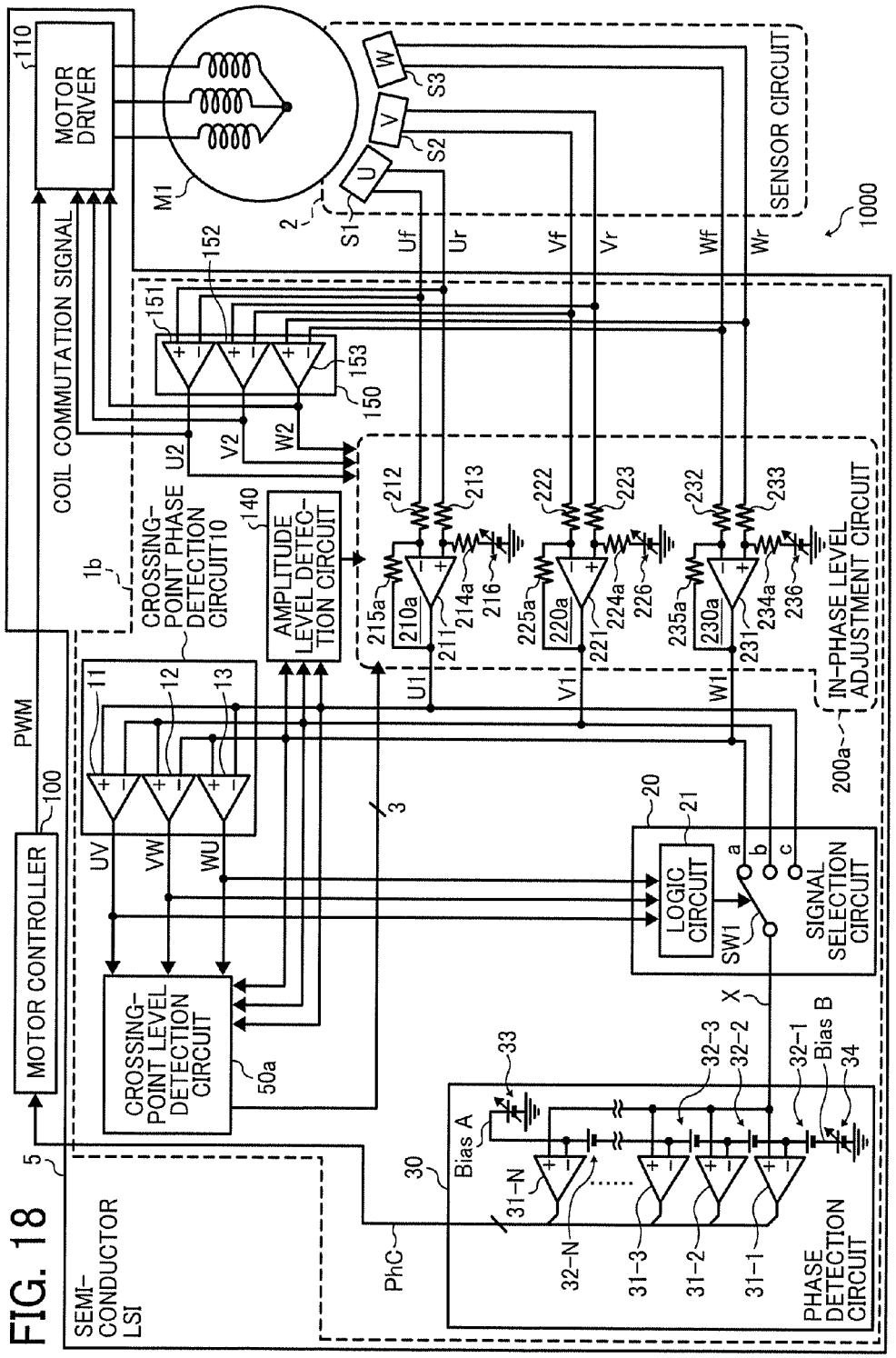
FIG. 18 is a block diagram of a configuration of a motor device according to a variation of the third embodiment of this disclosure.

FIG. 18 is a block diagram of a configuration of a motor device 1000 according to a variation of the third embodiment of this disclosure. For the motor device 1000 according to the variation of the third embodiment, the phase detector 1 and the motor driver 110 of the motor device according to the third embodiment are integrated as a semiconductor large scale integrated circuit (hereinafter, semiconductor LSI) 5. The motor driver 110 is typically integrated using a semiconductor LSI. In this variation, the phase detection circuit 30 is also integrated with the semiconductor LSI into a single chip. Such a configuration allows a size reduction due to omission of an optical encoder while suppressing a size increase from a conventional device.

A configuration of integration as a semiconductor LSI is not limited to the semiconductor LSI 5 illustrated in FIG. 18. In some embodiments, only the crossing-point phase detection circuit 10 and the phase detection circuit 30 are integrated as a semiconductor LSI. In some embodiments, the motor controller 100 is integrated with the configuration of FIG. 18 as a semiconductor LSI. In some embodiments, since the motor driver 110 of FIG. 18 drives driving phase coils and may be a heating source, only the motor driver 110 is separated and other components are integrated as a semiconductor LSI.

Second Variation of First Embodiment

As described above, the phase detector 1 according to the first embodiment generates the voltages BiasA and BiasB of crossing-point levels with the variable voltage sources 33 and 34. The configuration of generating the voltages BiasA and BiasB is not limited to that of the first embodiment. For example, in some embodiments, voltages BiasA and BiasB of crossing-point levels are supplied from the outside of the phase detector 1. Further, in the first embodiment, the sensor circuit 2 outputs the detection signals Uf, Vf, and Wf and the reverse phase signals Ur, Vr, and Wr of detection results of the sensors S1 to S3. However, the output signals of the sensor circuit 2 are not limited to the detection signals Uf, Vf, and Wf and the reverse phase signals Ur, Vr, and Wr. In some embodiments, instead of the detection signals Uf, Vf, and Wf and the reverse phase signals Ur, Vr, and Wr, the phase detector 1 performs the above-described operation on multiple sensor processing signals obtained by performing signal processing on the sensor signals. The same goes to the above-described other embodiments.

Figure 19A:
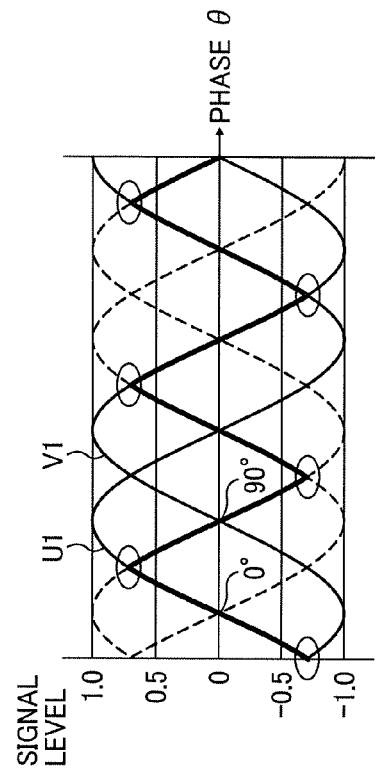
FIGS. 19A and 19B are graphs of operation of a phase detector according to another variation of this disclosure.
Figure 19B:
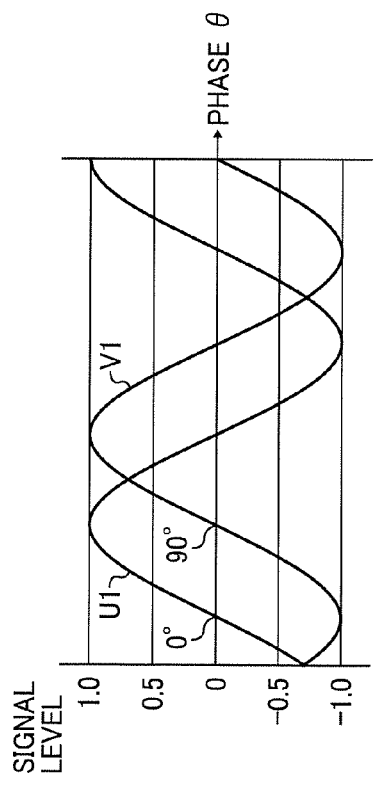

FIGS. 19A and 19B are graphs of operation of a phase detector according to another variation of this disclosure.

The phase detectors 1, 1*a*, and 1*b* according to the above-described embodiments of this disclosure detect rotational positions of the motor M1 for processed sensor signals U1, V1, and W1 of three phases. However, the number of phases is not limited to three, and rotational positions of the motor M1 can be detected for multiple processed sensor signals other than three. For example, in two processed sensor signals U1 and V1 set at intervals of an electric angle of 90° as illustrated in FIG. 19A, reverse phase signals of the processed sensor signals U1 and V1 are generated and superimposed as illustrated in FIG. 19B. As illustrated in FIG. 19B, by taking selection signals X based on crossing-points of the respective processed sensor signals, phases can be detected at predetermined threshold levels as in the first embodiment. The phase levels at this time can be corrected with the in-phase level adjustment circuit 200 in accordance with respective crossing-point levels and ideal crossing-point levels at intervals of an electric angle of 90°.

With reference to FIGS. 6 through 8, the examples in which only the sensor S3 has a mounting phase error are described above. However, the sensor having a mounting phase error is not limited to the sensor S3, and for example, the sensor S2 may also have a mounting phase error. When each of the sensors S2 and S3 has a mounting phase error, ideal processed sensor signals away from the sensor S1 at a certain electric angle can be set to adjust the respective in-phase levels as in the example of FIG. 7. The same goes to processed sensor signals of multiple phases.

As described above, in the semiconductor LSI 5 of FIG. 16, the motor drive controller including the phase detector 1 is integrated. The configuration of the semiconductor LSI is not limited to that of FIG. 16. In some embodiments, a semiconductor LSI includes, for example, the phase detectors 1, 1*a*, and 1*b*.

The phase detector 1*a* according to the second embodiment detects a maximum value of a processed sensor signal in the amplitude level detection circuit 140 to adjust the amplitude of the processed sensor signal. However, the detection target is not limited to the maximum value. For example, in some embodiments, a minimum value of a processed sensor signal is detected to adjust the amplitude of the processed sensor signal. In some embodiments, both a maximum value and a minimum value are detected to adjust the amplitude of the processed sensor signal. The phase detector 1*a* employs the differential amplifier circuits 210*a*, 220*a*, and 230*a* having simple configurations. However, the configuration of such amplifiers is not limited to that of the differential amplifier circuits 210*a*, 220*a*, and 230*a*. For example, in some embodiments, other adjusters capable of amplifying the in-phase level and amplitude level of processed sensor signal are employed instead of the differential amplifier circuits 210*a*, 220*a*, and 230*a*. The phase sections for in-phase level adjustment are not limited to the phase sections from −60° to 60° and from 150° to 240°, and any section including a phase section serving as the selection signal X can be used.

FIG. 11 illustrates the configuration of adjusting the in-phase level and the amplitude level. However, the adjustment configuration is not limited to the configuration of FIG. 11. For example, in some embodiments, for detection of the amplitude level, detection results of an analog/diginal (A/D) converter are digitally processed, and a control signal is generated so that the amplitude level has a predetermined signal level. For adjustment of the in-phase level, the target value of the crossing-point level is set to a predicted value based on the amplitude level of the processed sensor signal. For example, in FIG. 13, a signal level of half of the amplitude level can be set to the target value of the crossing-point level. In some embodiments, the target value of the crossing-point level is set from an external device of the phase detector 1a. Alternatively, in some embodiments, the target value of the crossing-point level is set to an average of each crossing point between upper-side and lower-side signal levels of adjacent crossing points in one cycle of a processed sensor signal or one rotation of a motor. By setting the target value of the crossing-point level to the average, a harmonic component is superimposed on a sine wave of the processed sensor signal and may affect a phase detection area. In such a case, though an error from an ideal crossing-point level arises, influence of the harmonic component can be effectively incorporated.

In FIG. 12, the adjustment of in-phase level and signal level is performed with reference to the phase section from −60° to 60° of the processed sensor signal U1 of the processed sensor signals U1, V1, and W1. However, the reference is not limited to the phase section of the processed sensor signal U1. For example, in some embodiments, the reference is a processed sensor signal in a section sandwiched by adjacent crossing points in one rotation of the motor. Setting such a single reference in one rotation of the motor allows correction of a phase error due to magnetizing variations of a permanent magnet or eccentricity of the motor.

Aspect According to a first aspect of this disclosure, a phase detector generates and outputs a phase data signal based on multiple sensor signals, each sensor signal having a signal level corresponding to a rotational position of a rotor of a motor having multiple coils. The phase detector includes a crossing-point phase detection circuit to compare signal levels of respective pairs of the sensor signals or processed sensor signals obtained by performing certain signal processing on the sensor signals, and output crossing-point phase detection signals indicating phases of crossing points between the respective pairs of the sensor signals or the processed sensor signals; a crossing-point level detection circuit to detect crossing-point levels indicating signal levels of the crossing points between the respective pairs of the sensor signals or the processed sensor signals and output multiple crossing-point level signals indicating the crossing-point levels detected; a signal selection circuit to select one of the sensor signals or the processed sensor signals as a selection signal; a phase detection circuit to detect that a signal level of the selection signal has reached a threshold level, and output a phase data signal indicating a phase of the rotor corresponding to the threshold level which the signal level has reached; and a threshold-level correction circuit to correct the threshold level based on the multiple crossing-point level signals.

According to a second aspect of this disclosure, the phase detector according to the second aspect of this disclosure further includes an amplitude level detection circuit to detect amplitude levels indicating signal levels of peak values of the sensor signals or processed sensor signals. The in-phase level adjustment circuit adjusts and outputs signal levels of the sensor signals to approach the amplitude levels detected with the amplitude level detection circuit to an identical amplitude level.

According to a third aspect of this disclosure, in the phase detector according to the first or second aspect of this disclosure, the in-phase level adjustment circuit adjusts the in-phase levels of the sensor signals for each predetermined phase section including a phase section selected as the selection signal from the sensor signals.

According to a fourth aspect of this disclosure, in the phase detector according to any one of the first to third aspects of this disclosure, the in-phase level adjustment circuit determines a predetermined phase section including a phase section selected as the selection signal from the sensor signals when a sensor signal different from a sensor signal of which the in-phase level adjustment circuit adjusts an in-phase level reaches the predetermined signal level.

According to a fifth aspect of this disclosure, in the phase detector according to any one of the first to fourth aspects of this disclosure, the sensor signals or the processed sensor signals have a waveform being substantially linear between adjacent two crossing points of the respective crossing points.

According to a sixth aspect of this disclosure, in the phase detector according to any one of the first to fifth aspects of this disclosure, the predetermined signal level is a setting value determined based on one of a predetermined value based on a peak value of each of the sensor signals, an average of crossing points included in the selection signal, or external data According to a seventh aspect of this disclosure, in the phase detector according to any one of the first to sixth aspects of this disclosure, the in-phase level adjustment circuit adjusts one of the in-phase level with reference to one of the sensor signals, one of the sensor signals in a phase section selected as the selection signal, or one of the sensor signals in a phase section selected as the selection signal in one rotation of the motor.

According to an eighth aspect of this disclosure, in the phase detector according to any one of the first to seventh aspects of this disclosure, the signal selection circuit selects one of the sensor signals or the processed sensor signals for each of phase sections between adjacent crossing points of the respective crossing points to obtain multiple signals selected, and combines the multiple signals selected to generate the selection signal.

According to a ninth aspect of this disclosure, a motor drive controller includes the phase detector according to any one of the first to eighth aspects of this disclosure, and controls driving of the motor in accordance with the phase data signal from phase detector. The motor drive controller switches currents among the coils of the motor in accordance with the sensor signals or the processed sensor signals, or the phase data signal.

According to a tenth aspect of this disclosure, a motor device includes the motor and the motor drive controller according to the ninth aspect of this disclosure to control driving of the motor.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. A phase detector, comprising:
    a crossing-point phase detection circuit to compare signal levels of respective pairs of multiple sensor signals and output crossing-point phase detection signals indicating phases of crossing points between the respective pairs of the sensor signals, each of the sensor signals having a signal level corresponding to a rotational position of a rotor of a motor having multiple coils;

a crossing-point level detection circuit to detect crossing-point levels indicating signal levels of the crossing points between the respective pairs of the sensor signals and output multiple crossing-point level signals indicating the crossing-point levels detected;

a signal selection circuit to select one of the sensor signals as a selection signal;

a phase detection circuit to detect that a signal level of the selection signal has reached a threshold level, and output a phase data signal indicating a phase of the rotor corresponding to the threshold level which the signal level has reached; and an in-phase level adjustment circuit to adjust and output in-phase levels of the sensor signals to approach each of the crossing-point levels to a predetermined signal level.

2. The phase detector according to claim 1, wherein the sensor signals are signal-processed sensor signals.

3. The phase detector according to claim 1, further comprising an amplitude level detection circuit to detect amplitude levels indicating signal levels of peak values of the sensor signals,
wherein the in-phase level adjustment circuit adjusts and outputs signal levels of the sensor signals to approach the amplitude levels detected with the amplitude level detection circuit to an identical amplitude level.

4. The phase detector according to claim 1, wherein the in-phase level adjustment circuit adjusts the in-phase levels of the sensor signals for each predetermined phase section including a phase section selected as the selection signal from the sensor signals.

5. The phase detector according to claim 1, wherein the in-phase level adjustment circuit determines a predetermined phase section including a phase section selected as the selection signal from the sensor signals when a sensor signal different from a sensor signal of which the in-phase level adjustment circuit adjusts an in-phase level reaches the predetermined signal level.

6. The phase detector according to claim 1, wherein the sensor signals have a waveform being substantially linear between adjacent two crossing points of the respective crossing points.

7. The phase detector according to claim 1, wherein the predetermined signal level is a setting value determined based on one of a predetermined value based on a peak value of each of the sensor signals, an average of crossing points included in the selection signal, or external data.

8. The phase detector according to claim 1, wherein the in-phase level adjustment circuit adjusts the in-phase level with reference to one of the sensor signals.

9. The phase detector according to claim 1, wherein the in-phase level adjustment circuit adjusts the in-phase level with reference to one of the sensor signals in a phase section selected as the selection signal.

10. The phase detector according to claim 1, wherein the in-phase level adjustment circuit adjusts the in-phase level with reference to one of the sensor signals in a phase section selected as the selection signal in one rotation of the motor.

11. The phase detector according to claim 1, wherein the signal selection circuit selects one of the sensor signals for each of phase sections between adjacent crossing points of the respective crossing points to obtain multiple signals selected, and combines the multiple signals selected to generate the selection signal.

12. A motor drive controller, comprising:
a phase detector to output the phase data signal, the phase detector, comprising:
a crossing-point phase detection circuit to compare signal levels of respective pairs of multiple sensor signals and output crossing-point phase detection signals indicating phases of crossing points between the respective pairs of the sensor signals, each of the sensor signals having a signal level corresponding to a rotational position of a rotor of a motor having multiple coils;

a crossing-point level detection circuit to detect crossing-point levels indicating signal levels of the crossing points between the respective pairs of the sensor signals and output multiple crossing-point level signals indicating the crossing-point levels detected;

a signal selection circuit to select one of the sensor signals as a selection signal;

a phase detection circuit to detect that a signal level of the selection signal has reached a threshold level, and output a phase data signal indicating a phase of the rotor corresponding to the threshold level which the signal level has reached; and an in-phase level adjustment circuit to adjust and output in-phase levels of the sensor signals to approach each of the crossing-point levels to a predetermined signal level; and a motor control circuit electrically connected to the phase detector to generate a control signal based on the phase data signal; and a motor driving circuit electrically connected to the motor control circuit to switch currents among the coils of the motor in accordance with the control signal to control driving of the motor.

13. A motor device, comprising:
a motor; and
a motor drive controller electrically connected to the motor to control driving of the motor, the motor drive controller, comprising:
a phase detector to output the phase data signal, the phase detector comprising:
a crossing-point phase detection circuit to compare signal levels of respective pairs of multiple sensor signals and output crossing-point phase detection signals indicating phases of crossing points between the respective pairs of the sensor signals, each of the sensor signals having a signal level corresponding to a rotational position of a rotor of a motor having multiple coils;

a crossing-point level detection circuit to detect crossing-point levels indicating signal levels of the crossing points between the respective pairs of the sensor signals and output multiple crossing-point level signals indicating the crossing-point levels detected;

a signal selection circuit to select one of the sensor signals as a selection signal;

a phase detection circuit to detect that a signal level of the selection signal has reached a threshold level, and output a phase data signal indicating a phase of the rotor corresponding to the threshold level which the signal level has reached; and an in-phase level adjustment circuit to adjust and output in-phase levels of the sensor signals to approach each of the crossing-point levels to a predetermined signal level;

a motor control circuit electrically connected to the phase detector to generate a control signal based on the phase data signal; and a motor driving circuit electrically connected to the motor control circuit to switch currents among the coils of the motor in accordance with the control signal to control driving of the motor.

* * * * *